United States Patent
Hartmann

(10) Patent No.: US 7,111,660 B2
(45) Date of Patent: Sep. 26, 2006

(54) ROLL-UP DOOR ASSEMBLY

(75) Inventor: Andrew Hartmann, Muskegon, MI (US)

(73) Assignee: Fleet Engineers Inc., Muskegon, MI (US)

(*) Notice: Subject to any disclaimer, the term of this patent is extended or adjusted under 35 U.S.C. 154(b) by 0 days.

(21) Appl. No.: 10/605,114

(22) Filed: Sep. 9, 2003

(65) Prior Publication Data

US 2004/0140065 A1    Jul. 22, 2004

Related U.S. Application Data

(60) Provisional application No. 60/319,891, filed on Jan. 21, 2003.

(51) Int. Cl.
*E05D 15/16* (2006.01)

(52) U.S. Cl. .................................. 160/201; 160/235

(58) Field of Classification Search ................ 160/201, 160/229.1, 232, 133, 199, 135, 231.1, 233, 160/234, 235, 236, 270; 16/355; 296/50, 296/106; 292/241, DIG. 32, DIG. 36
See application file for complete search history.

(56) References Cited

U.S. PATENT DOCUMENTS

| | | | | |
|---|---|---|---|---|
| 2,184,879 A | * | 12/1939 | Woernle ........................ 292/75 |
| 2,880,796 A | * | 4/1959 | Stroup ......................... 160/232 |
| 2,942,561 A | * | 6/1960 | Cheshire ...................... 105/404 |
| 3,044,287 A | * | 7/1962 | Pelcin ........................... 70/99 |
| 3,118,702 A | | 1/1964 | Kale et al. |
| 3,149,864 A | * | 9/1964 | Foster .......................... 292/21 |
| 3,449,005 A | * | 6/1969 | Pastva, Jr. .................. 292/173 |
| 3,570,579 A | | 3/1971 | Matsushima |
| 3,622,189 A | * | 11/1971 | Rosehitz et al. ............ 292/240 |
| 3,740,978 A | * | 6/1973 | Smith et al. .................. 70/100 |
| 3,799,593 A | * | 3/1974 | Dielman ...................... 292/145 |
| 3,802,726 A | * | 4/1974 | Galbreath et al. .......... 292/100 |
| 3,941,180 A | | 3/1976 | Thill |
| 3,967,671 A | | 7/1976 | Stanley et al. |
| 4,014,572 A | * | 3/1977 | Binns ........................ 292/108 |
| 4,343,340 A | * | 8/1982 | Paule ......................... 160/232 |
| RE31,461 E | * | 12/1983 | Martin et al. ............ 29/525.01 |
| 4,432,591 A | * | 2/1984 | Rinkewich .................. 312/297 |
| 4,510,779 A | * | 4/1985 | Ahad ........................... 70/208 |
| 4,532,973 A | | 8/1985 | DeFalco |
| 4,630,664 A | | 12/1986 | Magro |
| 4,723,588 A | * | 2/1988 | Ruppel ....................... 160/236 |
| 4,771,816 A | | 9/1988 | Clay, Jr. |
| RE32,915 E | * | 5/1989 | Jentoft et al. ................ 52/200 |
| 4,893,666 A | | 1/1990 | Hormann |
| 4,924,932 A | | 5/1990 | Esnault |
| 4,930,561 A | | 6/1990 | Clay |
| 4,972,894 A | * | 11/1990 | Machill ....................... 160/235 |
| 4,979,553 A | | 12/1990 | Lowry, III et al. |
| 4,995,652 A | * | 2/1991 | Mugnolo et al. ............ 292/202 |
| 5,133,108 A | | 7/1992 | Esnault |

(Continued)

*Primary Examiner*—Blair M. Johnson
(74) *Attorney, Agent, or Firm*—McGarry Bair PC

(57) ABSTRACT

A lightweight roll-up door comprises multiple lightweight panels that can be transversely installed/removed with a simple hinge assembly. The panels are hinged about one edge and have outer complementary arcuate portions that fill the gap at the edges of the door as the panels rotate about the hinge. The panels are extruded from a lightweight material. Additionally, the panels are structurally capable of supporting the necessary door hardware without deformation or breakage. A latch assembly is mounted to an extruded bottom panel forming a latch recess for receiving the latch assembly and with multiple mounting supports disposed within the hollow interior and extending between the latch recess and the interior wall.

29 Claims, 19 Drawing Sheets

U.S. PATENT DOCUMENTS

| | | | |
|---|---|---|---|
| 5,148,850 A * | 9/1992 | Urbanick | 160/231.1 |
| 5,253,694 A * | 10/1993 | Bernardo | 160/133 |
| 5,365,993 A | 11/1994 | Jella | |
| 5,411,782 A * | 5/1995 | Jarvis et al. | 428/57 |
| 5,419,386 A | 5/1995 | Magro et al. | |
| 5,421,627 A * | 6/1995 | Yane | 292/162 |
| 5,482,333 A * | 1/1996 | Gehrs et al. | 292/163 |
| 5,515,902 A * | 5/1996 | Hoffman | 160/235 |
| 5,564,164 A * | 10/1996 | Jella | 16/355 |
| 5,611,383 A * | 3/1997 | Hoffman | 160/133 |
| 5,622,012 A * | 4/1997 | Schijf | 52/71 |
| 5,669,431 A | 9/1997 | Druzynski et al. | |
| 5,709,259 A * | 1/1998 | Lewis et al. | 160/201 |
| 5,909,762 A | 6/1999 | Denoual et al. | |
| 5,915,444 A | 6/1999 | Sastri et al. | |
| 5,921,307 A | 7/1999 | Ford et al. | |
| 5,927,368 A * | 7/1999 | Rohrer et al. | 160/201 |
| 5,957,186 A * | 9/1999 | Boswell | 160/201 |
| 6,076,590 A | 6/2000 | Ford et al. | |
| 6,098,696 A * | 8/2000 | Styra | 160/201 |
| 6,098,697 A | 8/2000 | Krupke et al. | |
| 6,119,307 A | 9/2000 | Weishar et al. | |
| 6,363,993 B1 * | 4/2002 | Aquilina | 160/229.1 |
| 6,408,486 B1 * | 6/2002 | Saliba et al. | 16/382 |
| 6,422,289 B1 * | 7/2002 | Miller | 160/133 |
| 6,431,605 B1 * | 8/2002 | Miller et al. | 280/854 |
| 2003/0029582 A1 * | 2/2003 | Aquilina | 160/201 |
| 2003/0070363 A1 * | 4/2003 | Bakalar | 49/409 |
| 2004/0101656 A1 * | 5/2004 | Adams | 428/141 |
| 2004/0103997 A1 * | 6/2004 | Mullet | 160/201 |

* cited by examiner

ROLL-UP DOOR ASSEMBLY

CROSS REFERENCE TO RELATED APPLICATIONS

This application claims the benefit of U.S. Provisional Application No. 60/319,891, filed Jan. 21, 2003.

BACKGROUND OF INVENTION

1. Field of the Invention

The invention relates to a roll-up door assembly of the type commonly used in a trailer for a semi-tractor or a truck. In one of its aspects, the invention relates to a lightweight roll-up door comprising multiple, longitudinally-oriented extruded panels having a longitudinal hinge axis that can be assembled transversely relative to the hinge axis. In another of its aspects, the invention relates to an extruded panel for a roll-up door, which includes an integrated mounting and guide system for positioning and attaching door hardware to the panel.

2. Description of the Related Art

Trailers for semi-tractors and delivery trucks have long used roll-up doors to control access through a rear opening of the trailer. Roll-up doors are often preferred over the vertically-hinged, outwardly swinging doors because the roll-up doors operate within the physical space of the trailer and do not require space beyond the trailer. The roll-up door is moveable between an opened and a closed position while being maintained entirely within the trailer whereas the swinging doors require room along the sides of the trailer to swing from the closed to the opened position. If the trailers are to be parked side-by-side, the swinging doors must be opened prior to parking the trailer or the trailers must be parked far enough apart to permit the doors to swing from the closed to the opened position, both of which are an inconvenience to the operator.

Roll-up doors typically comprise multiple panels, stacked one atop the other. The adjacent edges are hingedly connected together to form the entire door. The hinges are normally located on or near the adjacent longitudinal edges of the panels. There are generally two main types of hinged structures that can be categorized by the direction in which the panels must be assembled relative to the longitudinal axis of the panels. One hinge structure requires that the panels be slid laterally (in the same direction as the longitudinal axis) to hingedly couple/uncouple the panels. Another structure requires that the panels be moved to transversely or perpendicular to the longitudinal edge to hingedly couple/uncouple the panels.

Each panel usually includes a roller assembly comprising an axle that rotatably supports a roller or wheel. The axle is mounted to the panel, directly or through the hinge assembly. The wheel is received within a track mounted within the interior of the trailer. As the door is raised from the lowered or closed position to the raised or opened position, the panels move within the tracks and rotate relative to each other as needed about their respective hinges. The panels are constrained in their movement by the receipt of the rollers within the track. Thus, the maximum angle of rotation between any two panels can be controlled by the arc of the track.

Roll-up doors have several known problems or disadvantages. Many roll-up doors have panels that are made entirely of solid material, such as wood. The resulting door is exceptionally heavy and requires counter-balancing springs to lift and close the door. The counter-balancing springs reduce the usable volume of the trailer, which is highly undesirable given the great value placed upon usable volume for a truck or trailer.

Attempts to address this problem have focused on using lighter weight materials, especially extruded plastics. The resulting extruded panels are relative light in weight, but they often require special or complex hinge systems and special structural stiffening to accommodate the mounting of the roll-up door hardware such as handles and latch assemblies.

Many roll-up doors are often time-consuming to repair. When a roll-up door is damaged, usually the repair is affected by merely replacing one of the multiple panels. Unfortunately, most roll-up doors have a panel and hinge configuration that requires the removal of multiple or all of the panels to replace the damaged panel. Panels that have hinges that require the lateral sliding of the panels for assembly further exacerbate the replacement of a single panel in that all of the panels preceding the damaged panel must be removed from the tracks before the damaged panel can be laterally slid and uncoupled from the adjacent panels.

Solutions to this problem have tended to focus on hinge structures that permit the transverse addition/removal of the panels. Most of the current solutions rely on a relatively complex hinge construction to permit the transverse removal of the hinge as part of the transverse removal of the panel.

SUMMARY OF INVENTION

According to the invention, a light weight roll-up door for use in closing a rear opening of a truck or trailer comprises multiple elongated panels and a hinge assembly that is snap fit to the panels at the upper and lower edges thereof. Each panel has a generally rectangular periphery and is formed by extrusion of a light weight material to form inner and outer opposing surfaces spaced from each other and at least one elongated groove integrally formed in the inner surfaces at the edge portions thereof. The snap hinge assemblies have integral snap fit fasteners that are releasably received in the elongated grooves of the panels. Outer complementary arcuate portions on the panel upper and lower edges fill a gap at the facing edges of the panels as the panels rotate about the hinge.

In one embodiment of the invention, the snap fit fasteners comprise compressible fasteners. The compressible fastener comprises two spaced resilient fingers defining a gap therebetween and the fastener is compressed by deflecting at least one of the fingers into the gap at the facing edges of the panels. Typically, the outer cross-sectional periphery of the fastener generally conforms to the cross-sectional shape of the groove.

The hinge assembly preferably comprises multiple hinge elements, with each hinge element having its own first and second hinge plates and hinge. Further, one of the hinge elements includes an axle seat. The axle seat is a generally circular tubular portion the interior of which forms a socket. A wheel assembly comprising an axle and a wheel rotatably mounted to the axle, which is received within the axle seat.

The roll-up door according to the invention is used in combination with a trailer with an opening for selectively closing the opening in the trailer that is defined in part by a bottom wall of the trailer. The roll-up door has multiple elongated panels which are connected together at upper and lower sides in vertically oriented relationship. The hinge assembly rotatably couples adjacent panels. One of the panels is a bottom panel whose lower side is adjacent the trailer bottom wall when the roll-up door is mounted to the trailer and in a closed position. A latch assembly is mounted to the bottom panel and is adapted to be selectively coupled to the trailer to lock the roll-up door in the closed position. According to one embodiment of the invention, the bottom panel is an extrusion having a predominately hollow interior between and exterior and interior walls and comprises a latch recess in the exterior wall and multiple mounting supports disposed within the hollow interior and extending between the latch recess and the interior wall. The latch assembly is received in the latch recess.

The latch recess is preferably located on the exterior wall such that placement of the latch assembly therein positions the latch assembly in proper vertical position to selectively couple with the trailer. In one embodiment the latch assembly comprises a mounting plate and the latch recess has a height substantially equal to the height of the mounting plate to thereby fix the vertical position of the latch assembly when it is positioned within the latch recess. In a preferred embodiment of the invention, an alignment indicia is positioned on the front wall of the panel for use in laterally aligning the latch assembly relative to the bottom panel. Typically, the mounting supports comprise extruded walls extending between the latch recess and the interior wall and are arranged in spaced pairs and defining a channel therebetween in which a fastener can be received. Preferably, the spacing of the walls is such that a head of a mechanical fastener used to fasten the latch assembly to the bottom panel will overly at least a portion of at least one of the walls of a pair. Typically, the spacing of the walls is such that it is less than the outer diameter of a threaded fastener.

In a further embodiment of the invention, a backing plate recess is formed on the interior of the panel and at least part of the backing plate recess is opposite a portion of the latch recess. Further, the mounting supports extend between the latch recess and the backing plate recess.

In yet another embodiment of the invention, a reflector recess is formed in the exterior wall, located above the latch recess and of a size to receive therein a conspicuity reflector.

In accordance with another embodiment of the invention, a roll-up door for selectively closing an opening in a trailer is defined in part by a bottom wall of the trailer and the roll-up door comprises multiple elongated panels having opposing interior and exterior walls and an upper and lower sides connecting an upper portion of the walls and a lower portion of the walls, respectively. The panels are stacked in an upper side to lower side orientation, a hinge rotatably couples adjacent panels, and one of the panels is a bottom panel whose lower side is adjacent the trailer bottom wall when the roll-up door is mounted to the trailer and in a closed position. A latch assembly is mounted to the bottom panel and is adapted to be selectively coupled to the trailer to lock the roll-up door in the closed position. The bottom panel is extruded and has a predominately hollow interior between exterior and interior walls. A reflector recess is formed in the exterior wall, located near a bottom portion of the panel and of a size to receive therein a conspicuity reflector.

The bottom panel further has a latch recess in the exterior thereof at the bottom portion thereof and the latch assembly is mounted in the latch recess. The reflector recess is formed above the latch recess.

In one embodiment of the invention, a roller is adapted to mount into a rail at the side of the truck or trailer opening and a wear resistant axle is received in a socket in the panels. A socket made of a wear resistant material is attached to each of the lateral sides of the panels and receives an axle of the wheel assembly therein. In one embodiment of the invention, the sockets are formed of a wear-resistant metal. In another embodiment of the invention, the sockets are formed of a tough, wear-resistant plastic, such as nylon or polypropylene.

In a preferred embodiment of the invention, the sockets further include a mounting plate through which the sockets are mounted to the panels and the sockets are integrally formed with the mounting plates. Typically, the axles are made of metal.

The panels are extruded and have open ends. The panels are preferably formed of a rigid plastic material or a lightweight metal. Typically, end caps close the open ends of the panels and include mounting tabs that fit within open ends of the panels. The end caps are made of an injected molded plastic.

The mounting plates are fastened to the panels with mechanical fasteners that extend through the exterior and interior walls, through the mounting tabs of the end plates and through the socket mounting plate.

DETAILED DESCRIPTION

Figure 1:
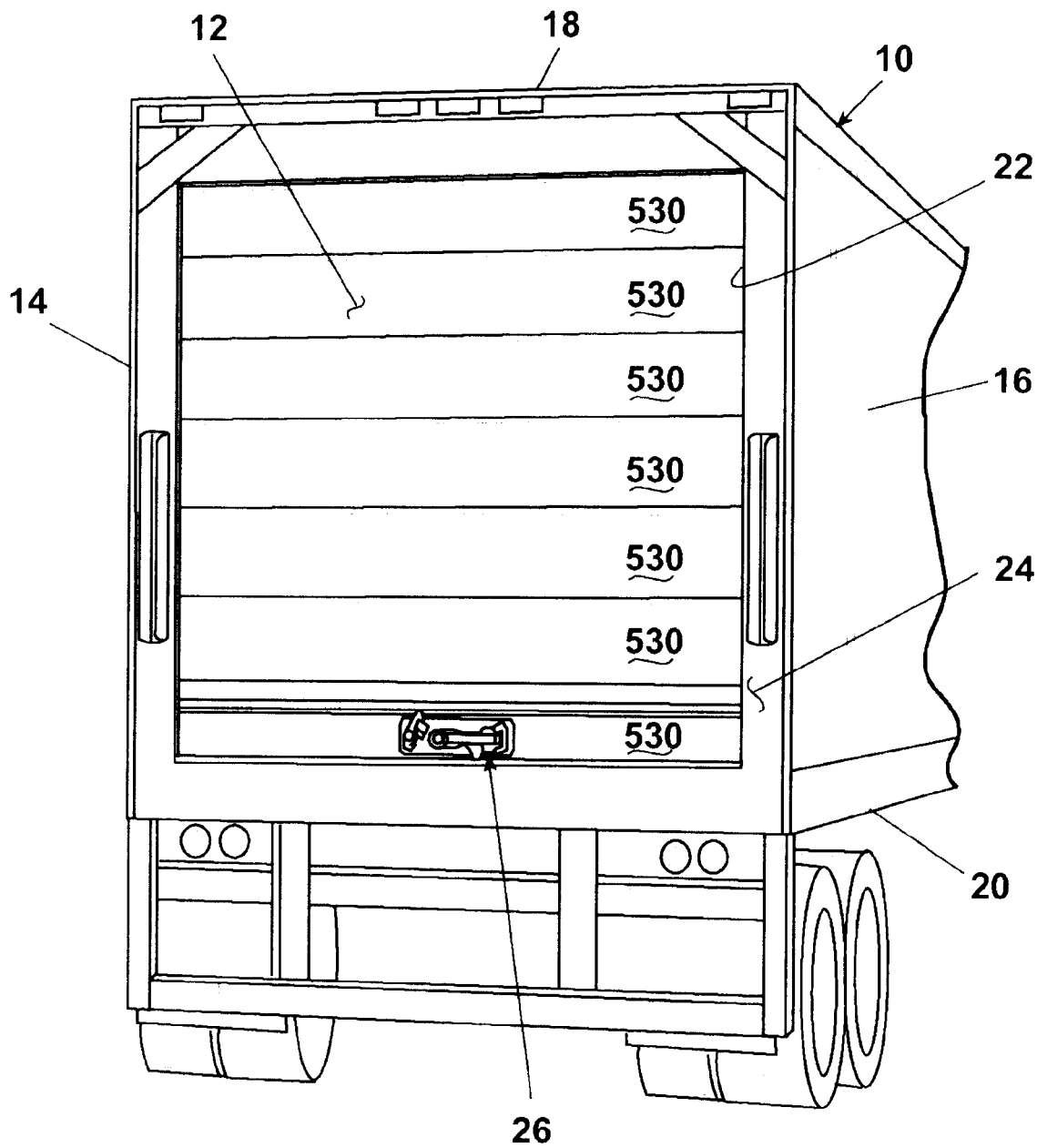
FIG. 1 is a rear perspective view of a trailer incorporating a roll-up door according to the invention, with the roll-up door comprising multiple, hingedly-coupled panels moveably mounted within a track.

Referring to FIG. 1, a truck or semi-trailer 10 incorporates a roll-up door 12 according to the invention. The trailer 10 is of a well-known design and comprises opposing sidewalls 14, 16, which are connected at their upper ends by a top wall 18 and at their lower ends by a bottom wall 20. The top wall 18, bottom wall 20, and sidewalls 14, 16 collectively define a rear opening 22 that is bounded by a peripheral frame 24. The roll-up door 12 is mounted to the trailer 10 such that the roll-up door 12 closes the rear opening 22 when the roll-up door is in the lowered position as illustrated in FIG. 1. A latch assembly 26 is provided for locking the roll-up door 12 in the closed position.

Figure 2:
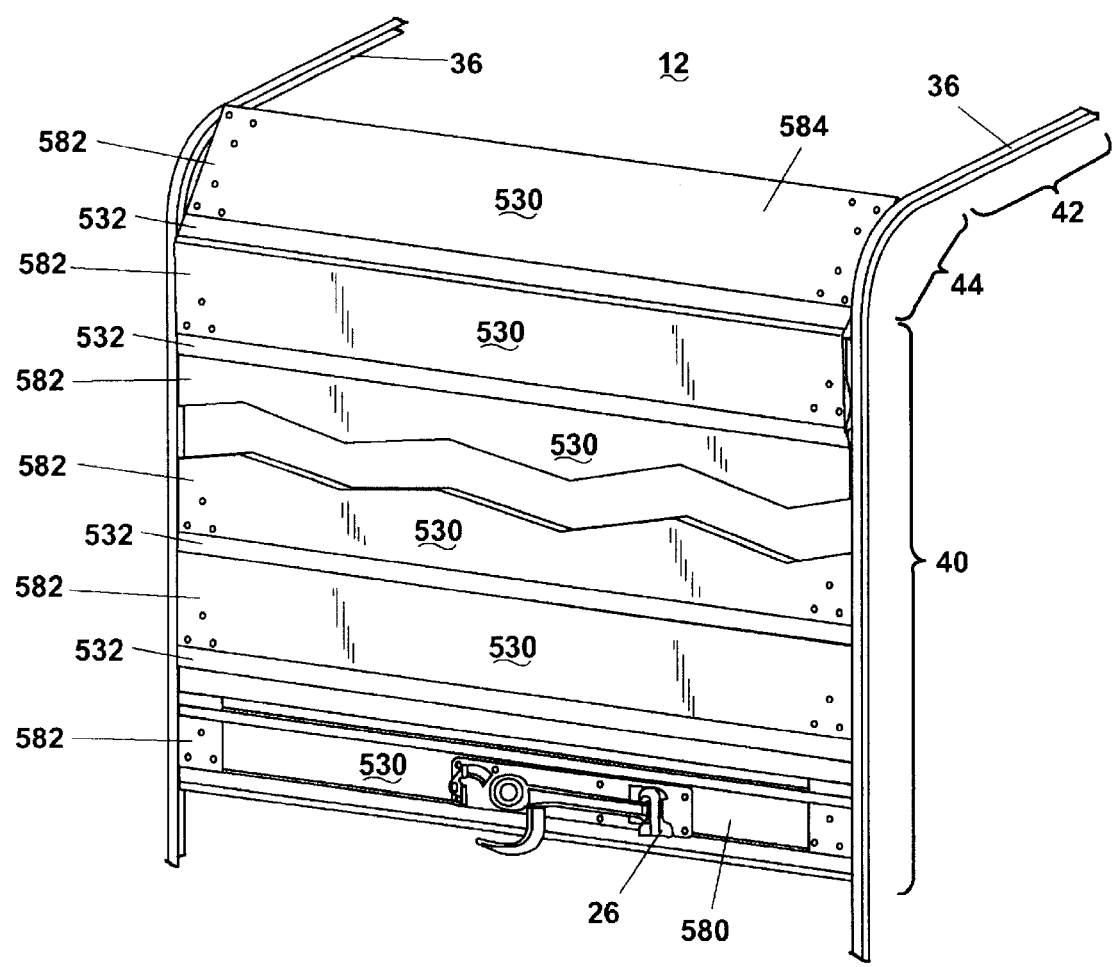
FIG. 2 is a perspective view of a first embodiment roll-up door according to the invention and comprising a bottom panel, intermediate panels, and a top panel, which are hingedly coupled by hinge assemblies.

Referring to FIG. 2, the roll-up door 12 is shown with the trailer 10, with the top wall 18, bottom wall 20, and sidewalls 14, 16 removed for clarity. The roll-up door 12 comprises multiple panels 530 that are hingedly connected by hinge assemblies 532. Roller assemblies 534 are carried by the hinge assemblies 532 on each side of the panels 530 and movably couple the panels 530 to a pair of tracks 36.

The tracks 36 are of a traditional design and have a stretched C-shaped cross-section that defines a channel in which the roller assemblies 34 are received. The tracks 36 are typically mounted to the sidewalls 14, 16, respectively. Each of the tracks 36 can be conceptually divided into a vertical portion 40 and a horizontal portion 42, which are connected by a curved or turn portion 44. The vertical portion 40 is normally located adjacent to the peripheral frame 24 of the trailer 10 and the horizontal portion 42 is normally located adjacent the top wall 18 of the trailer. In this manner, the multiple, hingedly-connected panels 530 can be moved from the closed or lowered position as seen in FIG. 1, where almost all of the panels are located in the vertical portion 40 of the tracks 36, to an opened or raised position, where almost all of the panels are received in the horizontal portion 42 of the tracks 36. The curved portion 44 aids in transitioning the multiple, hingedly-connected panels 530 from the vertical portion to the horizontal portion.

Figure 3:
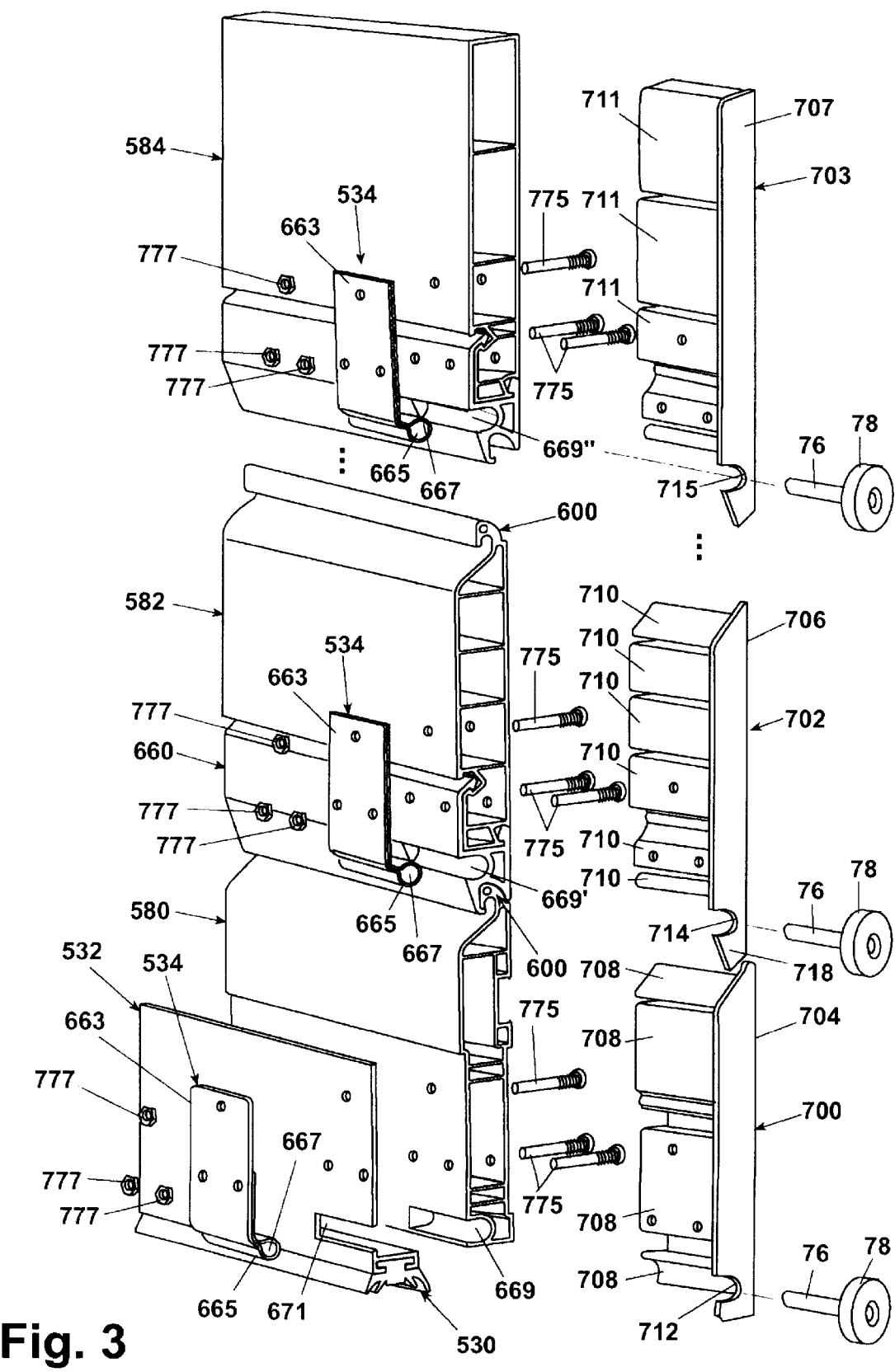
FIG. 3 is an exploded partial perspective assembly view showing a hingedly coupled lower panel and upper panel and the assembly of the seal assembly, axle bracket assembly, and end caps to the panels.

Referring to FIGS. 2 and 3, in the preferred embodiment, there are three different types of panels 530 used to form a complete roll-up door 12 and include a bottom panel 580, intermediate panel 582, and top panel 584. A complete roll-up door 12 will include a single bottom panel 580 and a single top panel 584 between which are disposed multiple intermediate panels 582. The bottom panel 580 is the lower-most panel of the roll-up door 12 and the top panel is the uppermost panel of the roll-up door 12 as their names connote.

The bottom panel 580, intermediate panel 582, and top panel 584 all have the same general structure but do vary in specific structure, mostly at upper and lower sides because of different functional requirements associated with their physical position within the roll-up door 12. For example, the bottom panel 580 provides for mounting the latch assembly 26 along with aiding and sealing the roll-up door 12 to the trailer 10.

Each of the panels is hingedly connected by the hinge assembly 32, which comprises a hook 600 and a hinge coupler 660. The hook 600 is integrally formed on an upper edge of the bottom panel 580 and intermediate panels 582. The hinge coupler is mounted to the lower edge of the intermediate panels 582 and the top panel 584. The hinge coupler 660 pivotally mates with the hook 600 to hingedly couple the adjacent panels.

A wheel assembly 534 comprising a mounting plate 663 with a shaft sleeve 665 and a wheel 78 rotatably mounted on a shaft 76 connects each panel to the rails. The shaft 76 is slidably received within the shaft sleeve to mount the wheel to the panel through the mounting plate 663. Fasteners 775 secure the mounting plate to the corresponding panel.

Figure 4:
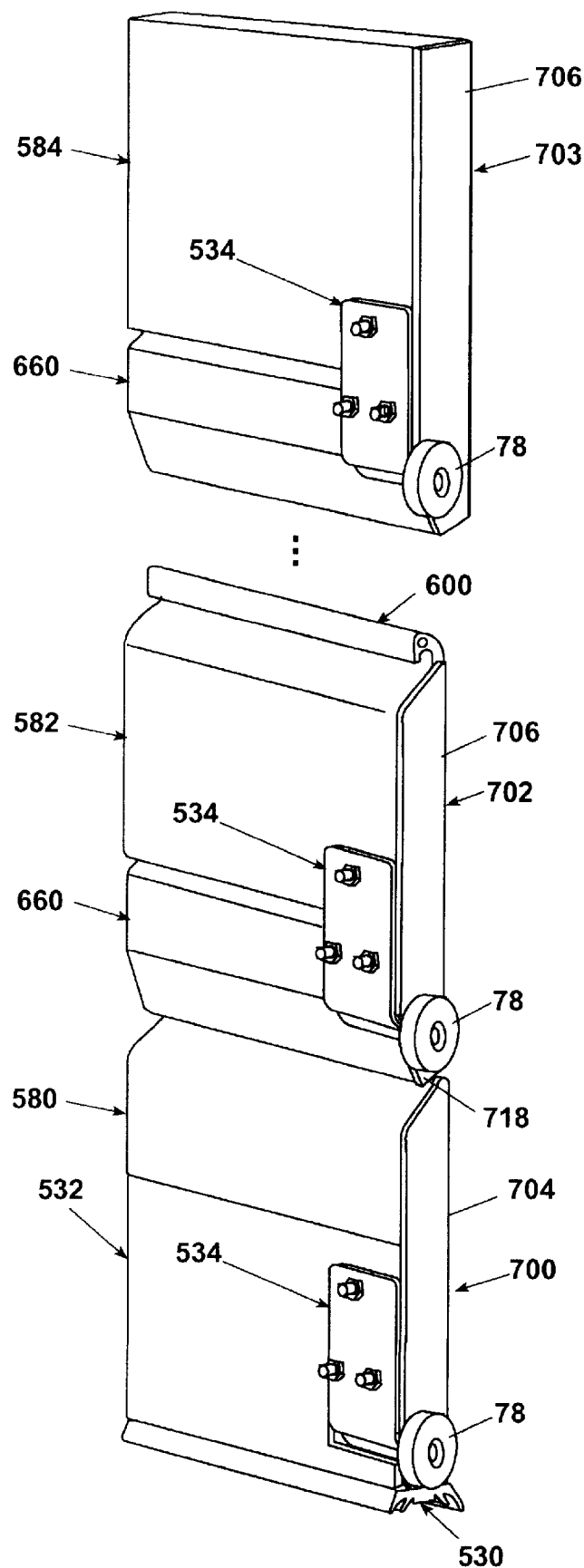
FIG. 4 is an assembled partial perspective view of the door elements of FIG. 3 assembled.

End caps 700, 702, and 704 are mounted to the ends of each panel to close off the exterior as is best seen in FIG. 4. The end caps 700, 702, and 704 are preferably shaped such that they are slidably mounted within their corresponding panel 80, 82, and 84, respectively. The end caps 700, 702 and 704 are preferably made of an injected molded plastic such as polypropylene.

A seal assembly 532 is mounted to the lower edge of the lower panel 80. The seal assembly 532 aids in sealing the bottom of the door with the trailer frame.

Figure 5:
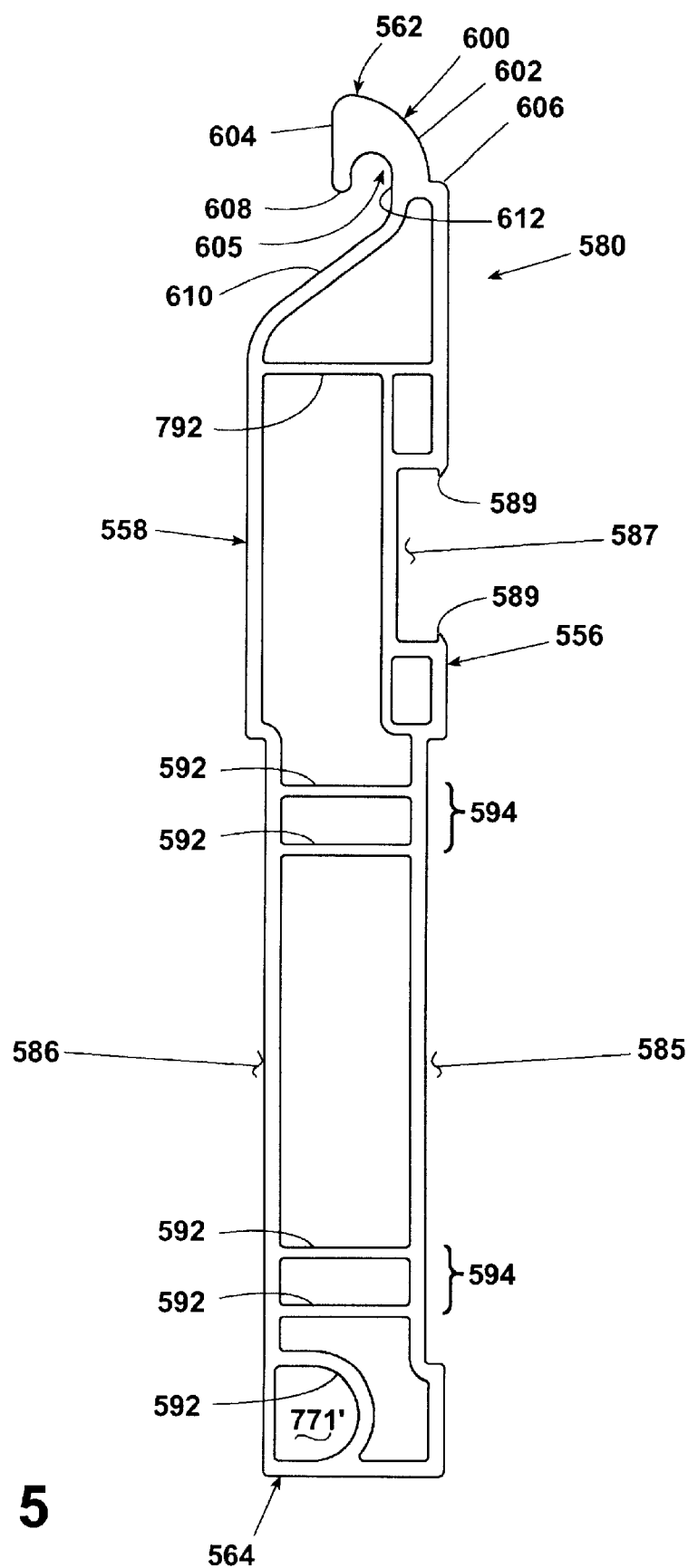
FIG. 5 is an end view of the bottom panel of FIG. 3 and illustrating an upper side structure forming a portion of the hinge.

Looking at the details of the roll-up door, FIG. 5 illustrates the details of the bottom panel 580, which comprises an upper side 562 and lower side 564, which connect outer wall 556 and inner wall 558 to form the basic panel structure. Strengthening ribs 592 extend between the outer and inner walls 556, 558. The ribs 592 are arranged in pairs to form fastener supports 594.

A latch assembly channel 585 and a reflector channel 587 are formed in the outer wall 556. A backing plate recess 586 is formed in the inner wall 558. The channels 585, 587 and recess 586 perform the same functions as the first two embodiments. Optional projections 589 that partially overlie the reflector channel 587 are provided on the outer wall 556. The optional projections permit the snap-in mounting of a reflector in the channel.

The projection 600 comprises a back 602 and a generally flat face 604 overlying a curl or recess portion 605. The back 602 terminates inwardly of the outer wall 656 to form a stop 606. The transition between the face 604 and the curl 605 forms a depending flange 608. The curl 605 comprises an angled portion 610 that transitions into a vertically oriented portion 612. The projection 600 functionally forms a hinge plate. The depending flange 608 forms part of the hinge.

Figure 6:
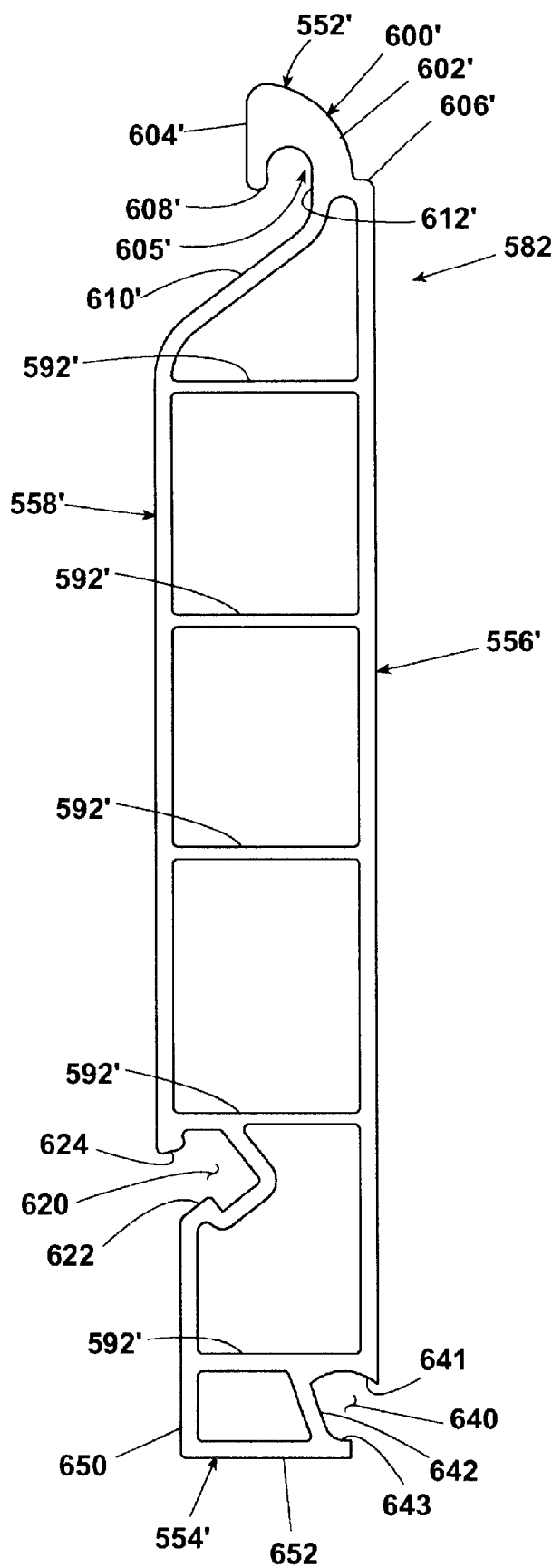
FIG. 6 is an end view of an intermediate panel of FIG. 3 and illustrating a lower side structure including first and second channels for connecting a hinge coupler.

Referring to FIG. 6, the intermediate panel 582 also comprises an upper side 552' and lower side 554', which connect outer wall 556' and inner wall 558' to form the basic panel structure. Strengthening ribs 592' extend between the outer and inner walls 556', 558'.

The intermediate panel further comprises the same projection 600' on the upper side 552' as the projection 600. Therefore the projection 600' will not be described further. Parts of the projection 600' corresponding to the projection 600 are identified with the same numeral followed by the prime ' suffix.

Figure 7:
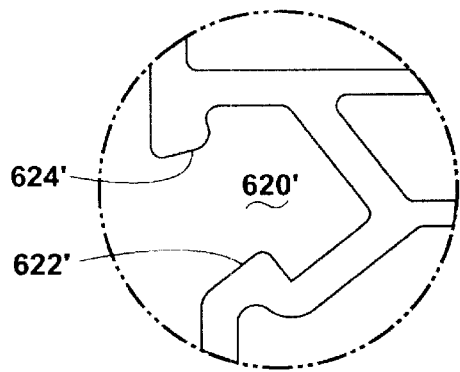
FIG. 7 is a detail drawing of the cross section for the first channel used in connecting the hinge coupler to the intermediate panel.
Figure 8:
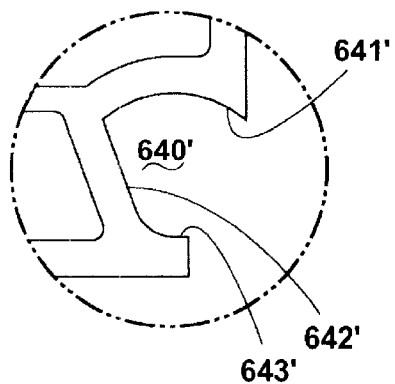
FIG. 8 is a detail drawing of the cross section for the second channel used in connecting the hinge coupler to the intermediate panel.

Referring to FIGS. 6–8, the lower end 554' of the intermediate panel 582 comprises a first channel 620 opening onto the inner wall 558, with a lip 622 extending into the channel 620. A catch 624 extends into the channel 620 on a side opposite the lip 622. The space between the lip 622 and the catch 624 defines an opening or throat for the channel.

A second channel 640 is formed in the outer wall 556' and comprises an arcuate side 641, an angled bottom 642, and a short arcuate side 643 opposing the arcuate side 641. The gap between the outer wall edges of the arcuate side 641 and short arcuate side 643 define an opening or throat to the second channel 640. The portion of the inner wall 558' transitioning between the first channel 620 and the second channel 640 comprises a step 650 and a riser 652.

Figure 9:
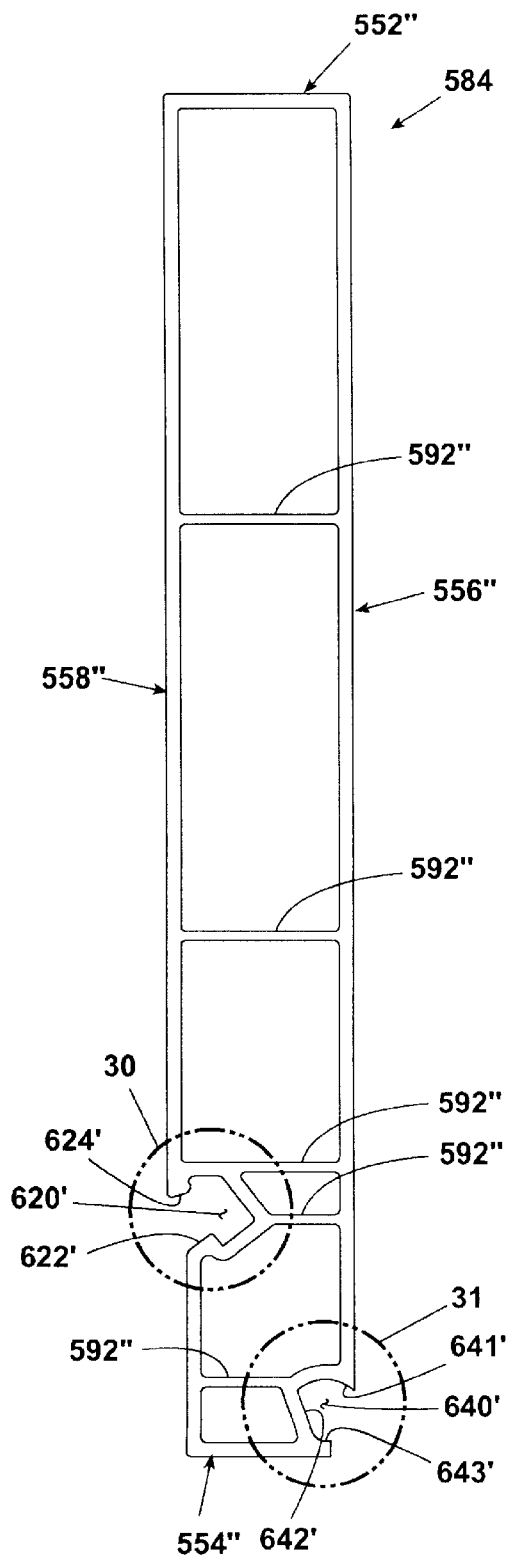
FIG. 9 is a end view of the top panel for the first embodiment incorporating the same lower end structure as the intermediate panel.

Referring to FIG. 9, the top panel 584 is illustrated in detail. The top panel 584 is similar to the bottom and intermediate panels 580, 582 in that it has top, bottom, outer and inner sides 552", 554", 556", and 558", with strengthening ribs 592" extending between the inner and outer sides 558" and 556". The top panel does not include a projection 600 as do the bottom panel 580 and the intermediate panel 582. Instead, the upper end 552 of the top panel 584 terminates in a flat surface.

The bottom side 554" of the top panel 584 does include first and second channels 620' and 640' that are identical to channels 620 and 640. Therefore, the structure of the channels 620' and 640' will not be described in further detail.

Figure 11:
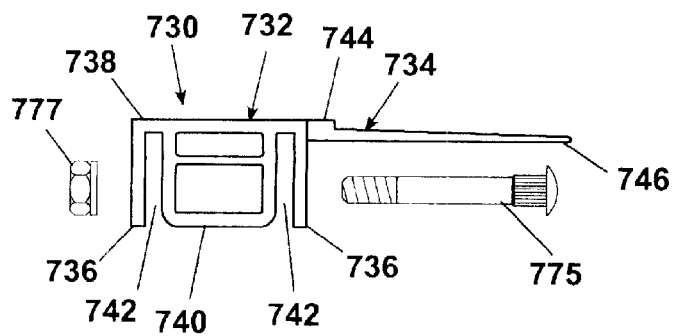
FIG. 11 is a side view of a top cap for the top panel.
Figure 10:
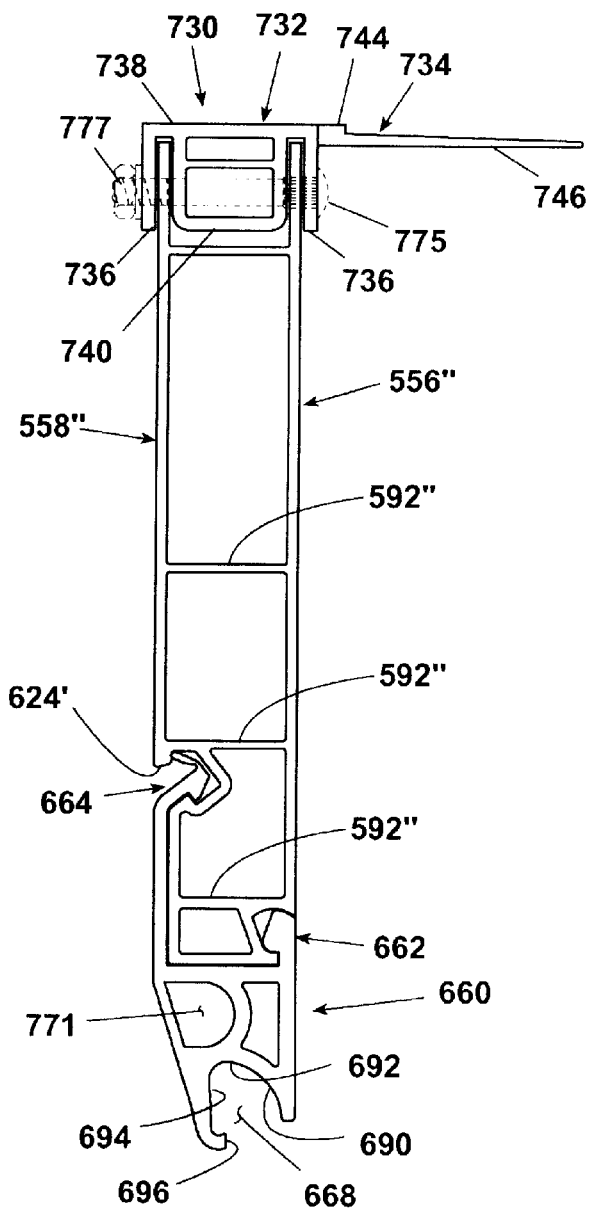
FIG. 10 is a side view of the top cap mounted to a top panel.

FIGS. 10 and 11 illustrate a top cap assembly 730 for use with the top panel 584 when it is necessary to remove an upper portion of the top panel 584 to adjust the overall door height to correspond to a particular door opening height. The need to alter the top panel 584 height arises because the panels 580, 582, and 584 are preferably extruded with a predetermined height. It is anticipated that the height of the vehicle opening and the available interior vehicle space for receiving the door in the raised position will not permit a door comprised of all full-height panels. In such a situation, one of the panels may need to be shortened in height by cutting away a portion of the panel. It is preferred to cut away the top portion of the top panel since it is not connected to any other panel or forms a seal with respect to the opening.

The top cap assembly 730 comprises a top cap 732 from which extends a seal 734. The top cap 732 comprises opposing sidewalls 736 whose upper ends are connected by a top wall 738. A guide 740 is located between the sidewalls 736 and extends away from the top wall 738 to form opposing channels 742. The channels 742 are preferably of a width greater than the thickness of the inner wall 558 and the outer wall 556, respectively, of the top panel to permit the top cap to be slidably mounted onto the cut top of the top panel 584 such that the guide 740 is received within the hollow interior between the inner wall 558 and the outer wall 556 while the sidewalls 736 are received on the exterior of the inner wall 558 and outer wall 556, respectively. Fasteners in the form of the previously described bolts 775 and corresponding nuts 777 secure the top cap 732 to the top panel 584 as shown in FIG. 43.

The seal 734 preferably extends laterally away from the top cap 732 and comprises an increased thickness portion 744 from which extends a tapering portion 746. It is preferred that the seal 734 be flexible to enhance the contact between the seal 734 and the door frame.

The top cap assembly 730 is preferably co-extruded such that the top cap 732 is made from one type of material and the seal 734 is made from another type of material. The top cap 732 is preferably made from the same material as the top panel 584. The seal 734 is made from a lower durometer material to increase its flexibility.

Figure 12:
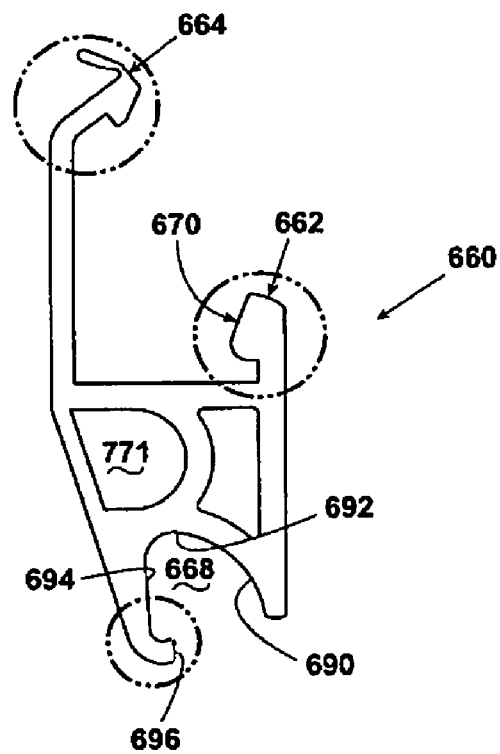
FIG. 12 is a end view of the hinge coupler for the first embodiment and which has first and second connectors that are received in the second and first channels, respectively, to mount the hinge coupler to a panel and a hook forming part of the hinge between adjacent panels.

Referring to FIG. 12 a hinge coupler 660 is shown and comprises first and second connectors 662 and 664 for connecting the hinge coupler 660 to the lower side of a panel. A hinge channel 668 is integrally formed with the hinge coupler 660. The hinge channel 668 cooperates with one of the projections 600, 600' to hingedly connect the upper side of one panel to the lower side 454 of another panel.

Figure 13:
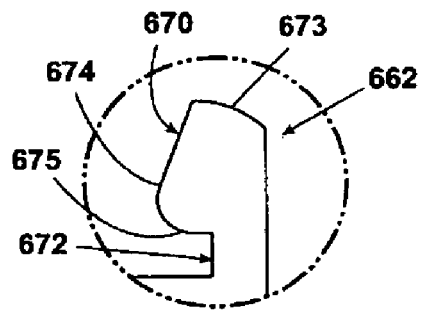
FIG. 13 is a detail of the first connector of the hinge coupler for coupling the hinge coupler to the second channel.

Referring to FIGS. 12 and 13, the first connector 662 comprises a head 670 connected by a neck 672 to the main portion of the hinge coupler 660. The head has an irregular shape defined by an arcuate surface 673, planar surface 674, and a short arcuate surface 675, which correspond respectively to the arcuate side, angled bottom, and short side of the second channel. The head 670 is sized such that the first connector 662 is received within the second channel 640 by inserting the head through the throat of the channel 640 when the head 670 is oriented relative to the throat at an angle between 20 and 45 degrees. Once the head 670 is inserted, the hinge coupler 660 can be rotated such that the arcuate surface 673, planar surface 674, and short surface 675 are adjacent the corresponding arcuate side, angled bottom, and short side of the second channel. The end of the short side of the second channel can also abut the neck 672 to limit the relative rotation of the hinge coupler and the panel to which it is mounted.

Figure 14:
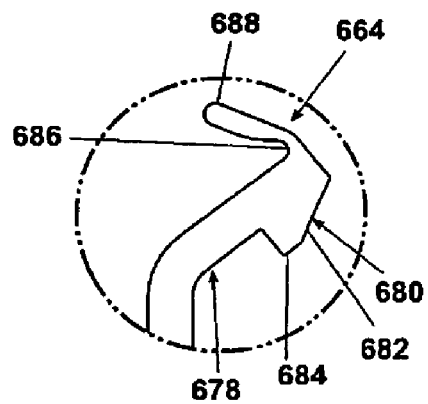
FIG. 14 is a detail of the second connector of the hinge coupler for coupling the hinge coupler to the first channel.

Referring to FIGS. 12 and 14, the second connector 664 also comprises a neck 678 that transitions into a head 680 having an asymmetrical cross-section. One side of the head 680 comprises an angled surface 682 that transitions into a laterally extending shoulder 684. A locking finger 688 extends from the other side of the head 680 and comprises reduced thickness area at the junction with the head to form a living hinge 686 about which the locking finger can rotate. The locking finger 688 preferable forms an acute interior angle with the head 680.

The second connector 664 in combination with the first connector 662 mounts the hinge coupler 660 to the lower side of a panel. Where the first connector 662 mounts to the outer wall of the panel, the second connector 664 mounts to the inner wall of the panel. The second connector 664 mounts to the inner wall by inserting the head 680 into the first channel 620. When the head 680 is inserted, the shoulder 684 of the bead 680 seats behind the lip of the first channel and the end of the finger 688 seats against the catch of the first channel. It is preferred that the finger 688 will be made of an inherently resilient material such that the finger 688 will naturally move into a seated position behind the catch. However, it is within the scope of the invention for the finger 688 to be manually moved into the seated position by the person assembling the door.

The resilient finger 688 functions as a lock and holds the second connector 664 within the first channel 620. The resilient finger 688 must be deflected into the channel 620 to provide sufficient clearance for the second connector 664 to be removed through the open end of the first channel 620. Once a portion of the second connector 664 has been removed from the first channel 620, the remainder of the second connector 664 can be "unzipped" by pulling outwardly on the first connector 662 which will continue to deflect the resilient finger 688 as the second connector 664 is removed.

Figure 15:
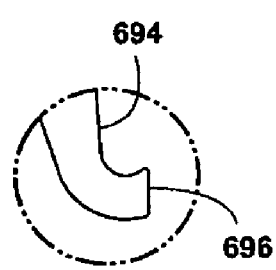
FIG. 15 is a detail of the hook of the hinge coupler for forming a portion of a hinge between adjacent panels.

Referring to FIGS. 12 and 15, the hinge channel 368 comprises an arcuate surface 690 that transitions through a radius 692 into a relatively straight portion 694. The straight portion 694 terminates in a hook 696. The hinge channel 668 has a mouth extending between the arcuate surface 690 and the hook 696.

Figure 16:
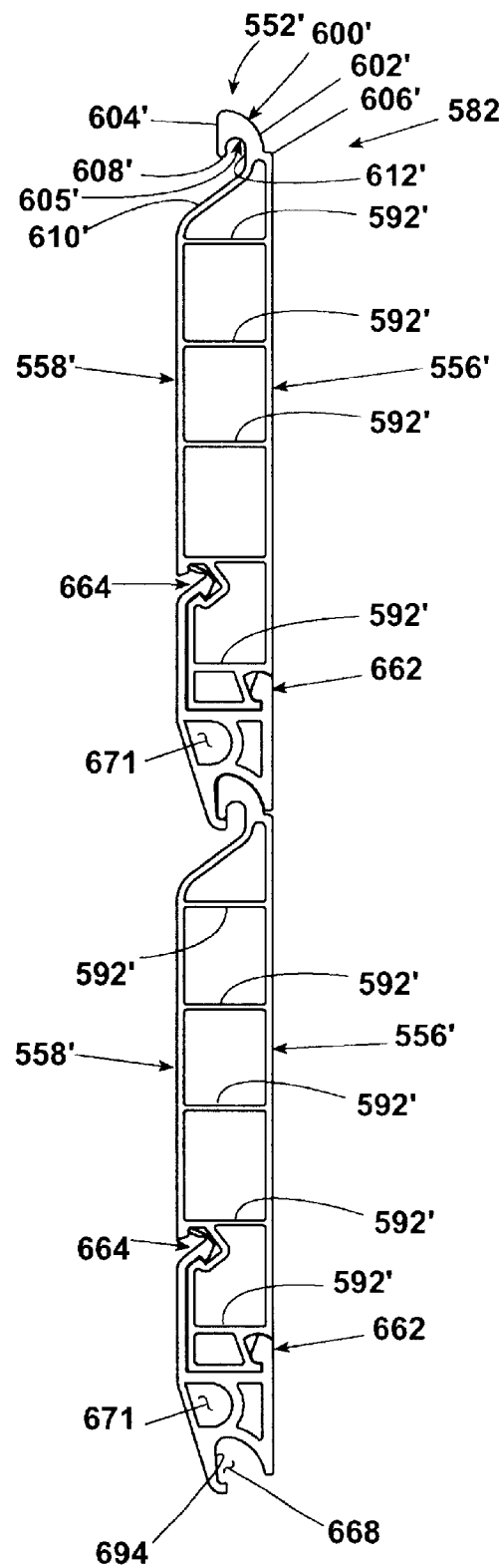
FIG. 16 is a side view of two intermediate panels hingedly connected by the hinge coupler.

FIG. 16 illustrates the hinge coupler 660 connecting the lower side 554' of an intermediate panel 582 to the upper side 552' of an adjacent intermediate panel 582. When coupled, the head 670 of the first connector 662 is received within the second channel 640 such that the arcuate surface 673 and short surface 675 of the head 670 abut the arcuate side 641 and the short side 643 of the second channel 640, respectively. The shoulder 682 of the second connector 664 as seated behind the lip 622 of the first channel 620 and the end of the finger 688 is seated against the catch 624.

Figure 17:
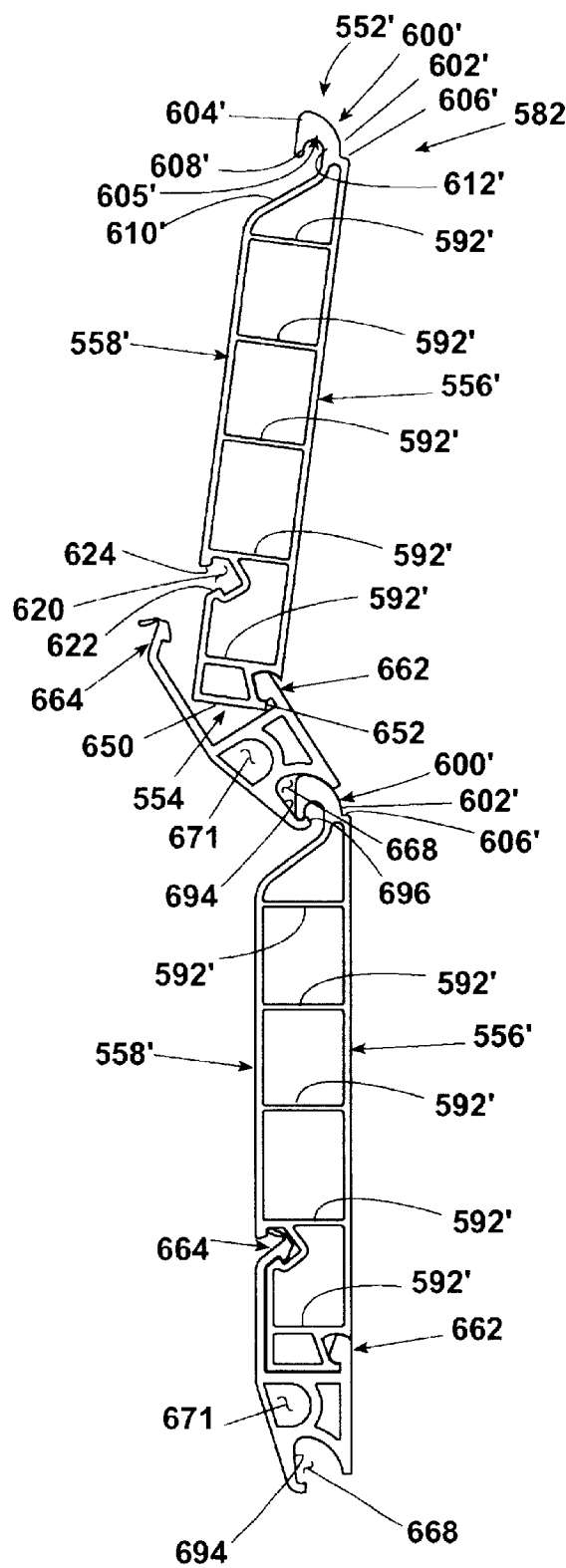
FIG. 17 is a side view similar to FIG. 16 with the intermediate panels partially disassembled.

FIG. 17 illustrates a partial disassembly of the intermediate panels 582 of FIG. 14. To disassemble the intermediate panels 582, the second connector 664 is removed from the first channel 620 by peeling the second connector 664 from the first channel. To initiate the peeling of the second connector, it is preferred that the person disassembling the panels rotate the finger 688 about the hinge 686 toward the head in a counter-clockwise direction as seen in FIG. 1. The rotation of the finger is continued until the head 680 of second connector can be pulled from the first channel 620. The continued pulling on the head 680 or neck 678 of the second connector 664 will remove both the head 680 and the finger 688 from the first channel 620.

Depending on the type of material used to form the finger 688 and the head 680 and/or the tolerances between the head 680, finger 688 and the first channel 620, it may be necessary to continuously, actively unseat the finger 688 as the head 680 is pulled from the first channel 620.

Figure 18:
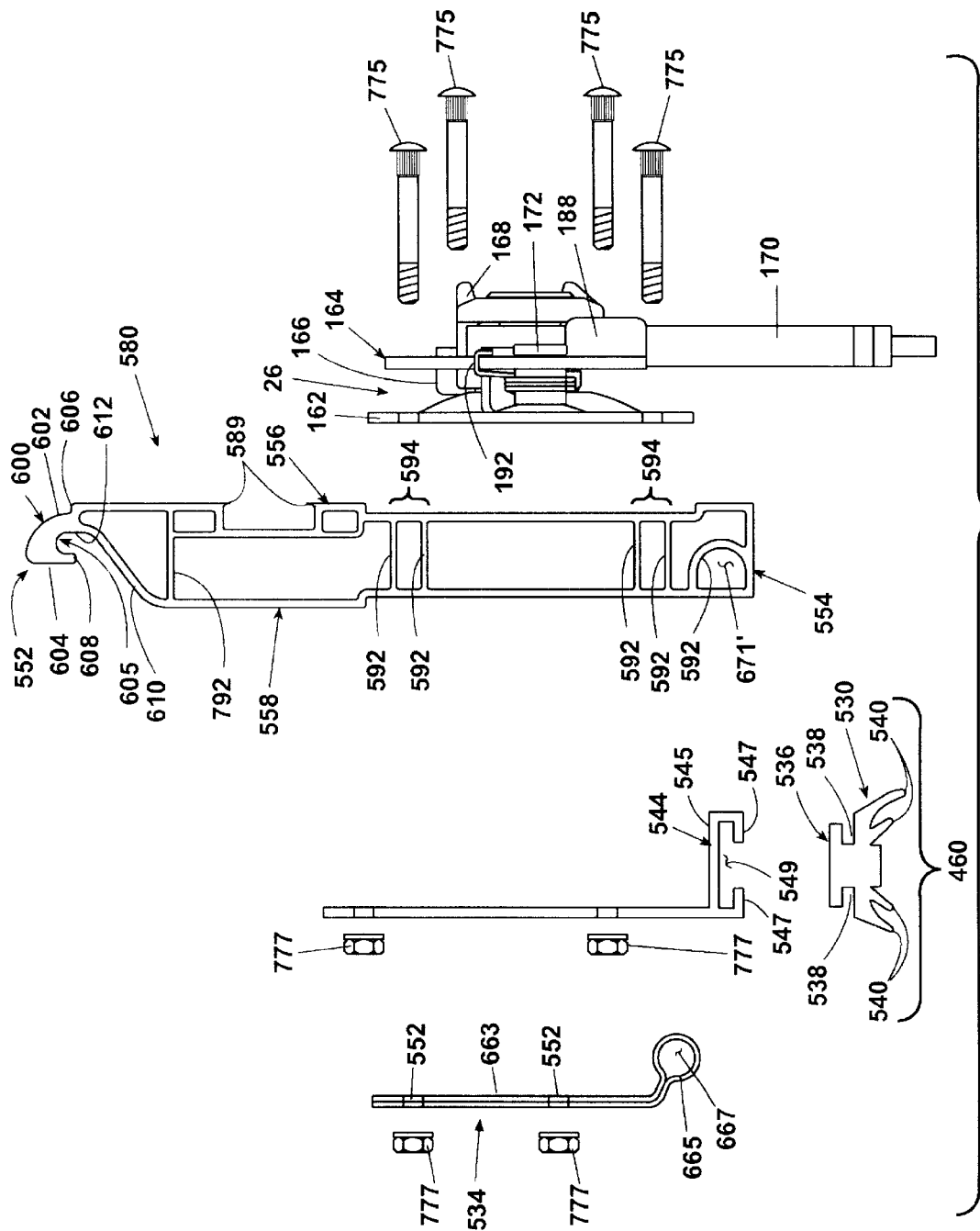
FIG. 18 is an exploded side assembly view of the bottom panel of the first embodiment and the corresponding door hardware comprising a latch assembly, a seal assembly, and an axle mounting bracket.
Figure 19:
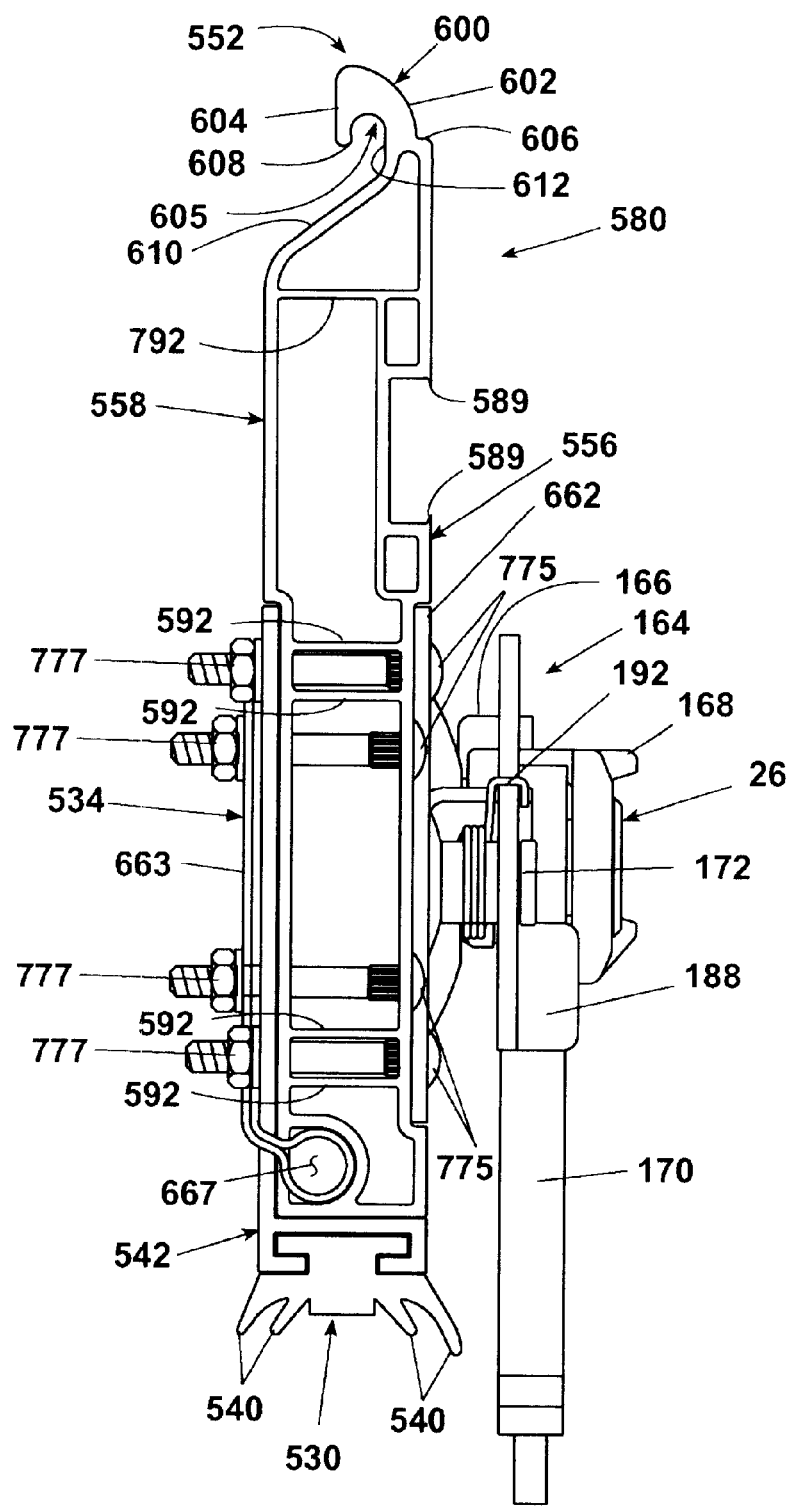
FIG. 19 is a side assembly similar to FIG. 18 showing the assembled bottom panel, latch assembly and axle mounting bracket.

FIGS. 18 and 19 illustrate the mounting of door hardware to the lower panel. The hardware includes latch assembly 26 and a seal assembly 460, with FIG. 18 showing latch and seal assemblies 26 and 460 in an exploded and then assembled.

Referring to FIG. 3 generally and FIGS. 18 and 19 specifically, the seal assembly 460 comprises a seal 630, backing plate 632, and axle mounting bracket 534. The seal 530 comprises a main body 536 in which are formed opposing slots 538 and from which extend the multiple longitudinal fingers or seals 540. The outermost finger 540 extends further from the body 536 and the other fingers 540.

The backing plate 532 comprises a vertical leg or face 542 from which laterally extends a seal mount 544. The seal mount 544 comprises an upper wall 545 from which extend opposing L-shaped legs 547, which in combination with the upper wall 545 define a T-shaped longitudinal opening 549. The T-shaped opening 549 is sized to longitudinally slidably receive the body 536 of the seal assembly 530 such that the legs 547 of the seal mount 544 are received within the opposing slots 538 of the body 536.

An advantage of the seal assembly 530 is that the body 536 is sized and attached to the seal mount such that forces acting on the seal assembly associated with the closing of the door are predominately carried by the central portion of body 536 and not the seals 540. The central portion of the body 536 is the cross-sectional portion located interiorially of the slots 538 and fingers 540 and extending the height of the seal assembly 530.

Referring to FIGS. 18 and 19 specifically and FIGS. 2 and 4 generally, the axle mounting bracket 534 comprises a metal mounting plate 663 and a tubular, metal mounting seat 665 whose interior defines a socket 667 for receiving the shaft of the wheel assembly. The mounting plate 663 can be made of metal or of a tough wear resistant plastic. Thus, the socket 667 is significantly more wear resistant that the extruded panels 580, 582 and 584.

Fasteners in the form of bolts 775 and nuts 777 secure the mounting plate 663 to the inner wall 558 of the intermediate panel 582. The bolt 775 pass through aligned openings 546, 552 and the lower panel to secure the backing plate 542 and the axle mounting bracket 534 to the panel. Similar fasteners are also used to secure the latch assembly 26 to the lower panel.

The bolts 775 preferably include a knurled portion near their head to prevent the rotation of the bolt as the nut is threaded onto the bolt. Other suitable bolt structures or features can also be used in place of the knurled portion to prevent the bolt from rotating when the nut is tightened. For example, the bolt can have a square cross section and the openings in either or both the panel and mounting plate can have a corresponding square cross section.

The axle seat 665 extends away from a plane defined by the mounting plate 663. An axle seat recess 669 and a backing plate opening 671, both sized to laterally receive the axle seat 665, are formed in the exterior of the inner wall 558 and in the backing plate 542. The backing plate opening 671 and the axle seat recess 669 permits the flush mounting of the axle seat assembly 661 to the inner wall 558 of the intermediate panel 582 while locating the centerline for the axle seat, which coincides with the axle rotational axis, closer to the center of the door.

The axle mounting bracket 534 mounts the wheel assembly to each of the intermediate and top panels. The metal axle seat of the axle mounting bracket provides greater wear. Also, the axle mounting brackets improve the ease of laterally assembling and disassembling the panels since the wheel assembles can be removed independently of the hinge coupler.

FIGS. 3 and 4 illustrate the mounting of the axle mounting bracket 534 to an intermediate panel 582 and a bottom panel 580, with both panels being connected by the hinge coupler 660. As with the bottom panel 580, the intermediate panel 582 also requires an axle seat recess 669' sized to receive the axle seat 665. Unlike the bottom panel 580, the axle seat recess 669' is formed in the exterior of the hinge coupler 660 at any side edge thereof, instead of in the lower edge of the intermediate panel 582. The axle seat recess 669' permits the flush mounting of the axle seat assembly 661 to the inner wall 558 of the intermediate panel 582. Additionally, the axle seat recess 669 permits the centerline of the axle seat 665, what ultimately formed the centerline for the axle of the wheel assembly, to be closer to the hinge axis of the adjacent panels, which is located at the junction of the depending flange 608' of the hook 600' and the hook 696 of the hinge coupler 660.

The bolts 775 and nuts 777 are used to mount the axle mounting bracket 534 to the intermediate panel 582 in the same manner as to the lower panel 580. The only difference is that the bolts must also pass through the hinge coupler 660.

Since it is preferred that the panels and the hinge coupler are extruded, it is anticipated that the axle seat recesses 669 or 669' will be formed in the corresponding panel or hinge coupler after the panel or hinge coupler 660 is extruded. To aid in the creation of the axle seat recess 669, the bottom panel 580 and hinge coupler 660 are extruded with a longitudinal recess 771 and 771' (FIGS. 5 and 10). Thus, a lesser amount of material needs to be removed from either the panel or the hinge coupler to form the axle seat recess 669 or 669'. The addition of the longitudinal recess 671 or 671' has the further benefit of reducing the amount of material needed to extrude the bottom panel 580 or hinge coupler 660.

Referring to FIGS. 2 and 3 it is preferred that an end caps 700,702, and 703 are used for closing the end of the bottom panel 580, intermediate panel 582, and top panel 584, respectively. The end caps 700,702, 703 comprise an end plate 704,706, 707 from which laterally extend a series of mounting tabs 708, 710, and 711.

The end plates 704,706, and 707 are complementary in shape to the side cross section of the bottom panel 580 and intermediate panel 582, respectively, such that when the mounting tabs 708,710, 711 are received within the interior of the corresponding panel 580, 582, the end plates 704,706, 707 close off and/or seal the opening and of the corresponding panel.

Each of the end plates includes a notch 712,714, 715 that aligns with the corresponding recess 671, 671', 671" to permit the passage of the axle for the wheel assembly. The end plate 706 also includes a stop portion 718 located between the notch 714. The stop portion 718 is sized to overlie the mated hook 600 and hinge coupler 660 to prevent the relative lateral movement of the bottom panel 580 and the intermediate panel 582.

The mounting tabs 708, 710, 711 can be of any number and shape. Preferably, the number and shape of the mounting tabs 708,710, 711 correspond to the interstitial spaces defined by the outer wall 556, inner wall 558, and the corresponding structural supports 592 and 592', 592".

The end caps 700,702, 703 perform several functions. Since the end caps seal the otherwise opened and of the panels, the end caps prevent moisture and dirt from collecting inside the panels. The end caps also prevent the door from racking since the individual panels are prevented from moving laterally relative to each other by the stop portion.

The extruded panel roll-up door according to the invention is advantageous over current wood panel roll-up doors because of the substantially reduced weight of the extruded panels. The reduced panel weight also permits weight reduction in other areas of the roll-up door. For example, a smaller and lighter counterbalancing spring is needed. For a semi-trailer with a width of 15 inches and height between 75 and 114 inches door opening, the overall weight difference between a roll-up door with extruded panels and one with wooden panels is approximately 40 lbs, permitting an equal weight of increased cargo to be carried by the trailer on each delivery. Over the life of the trailer, the additional load carrying capacity of a trailer with an extruded panel door translates into substantial increased profitability. The extruded panels are also much less susceptible to impact damage than wood panels, which reduces the need for panel replacement, resulting is a reduced operating cost for the extruded panels.

FIGS. 20–27 illustrate a second embodiment panel design for the roll-up door 12. The second embodiment panel design includes a bottom panel 280 (FIGS. 20 and 21), multiple intermediate panels 282 (FIG. 29), and a top panel 284 configuration (FIG. 22) similar to that of the first embodiment.

The main distinction between the second embodiment panel design and the first embodiment lies in how and where the hinge coupler connects to the intermediate and upper panels and an alternative seal assembly is shown. All other aspects of the two embodiments are substantially identical. Therefore, only the major differences between the first and second embodiments will be described, with it being understood that the description of the features for the first embodiment applies to similar features of the second embodiment.

Figure 20:
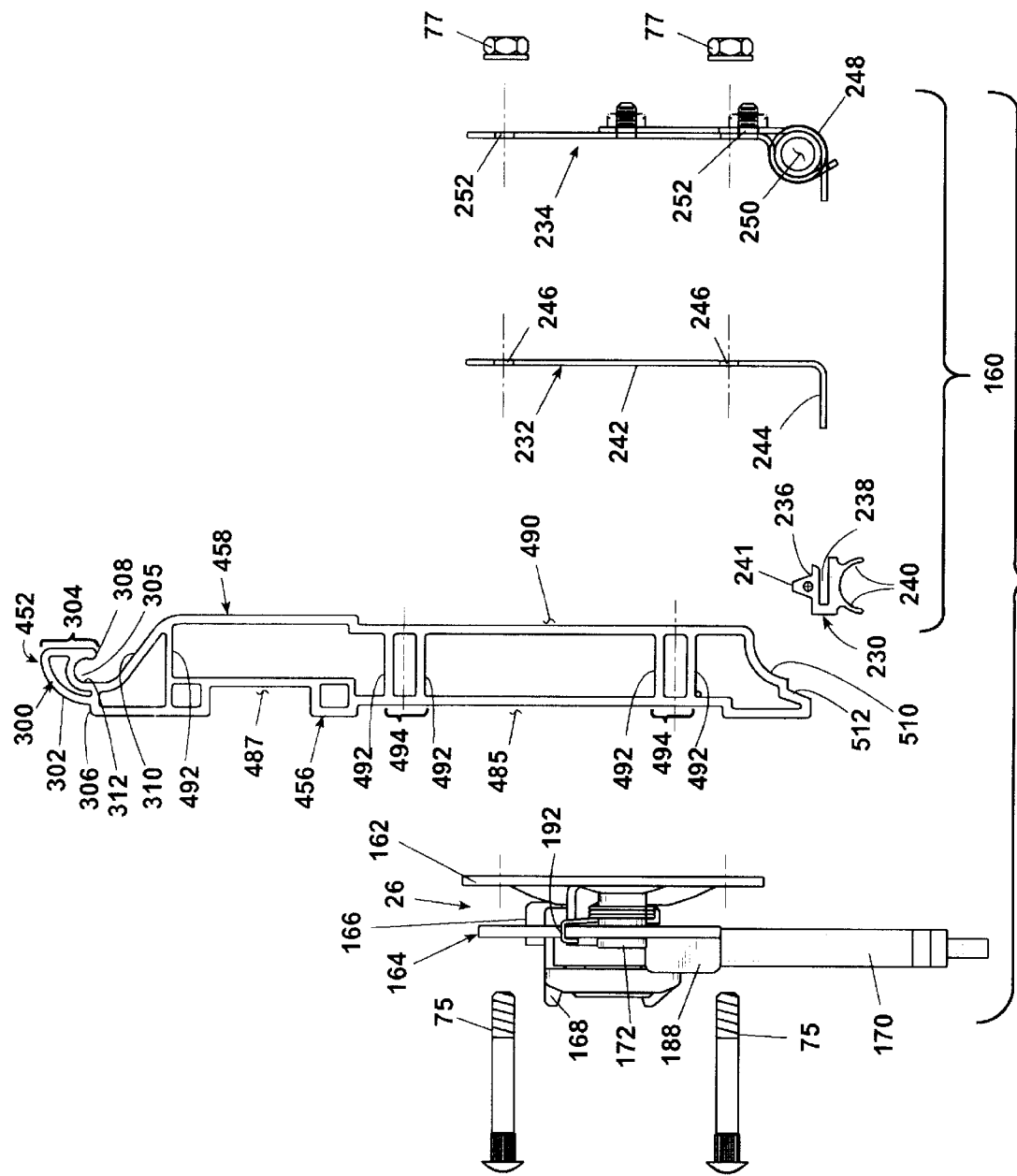
FIG. 20 is an exploded side view of the bottom panel, latch assembly, and a seal assembly of the roll-up door shown in FIG. 1 for sealing a lower side of the bottom panel relative to the truck or trailer.
Figure 21:
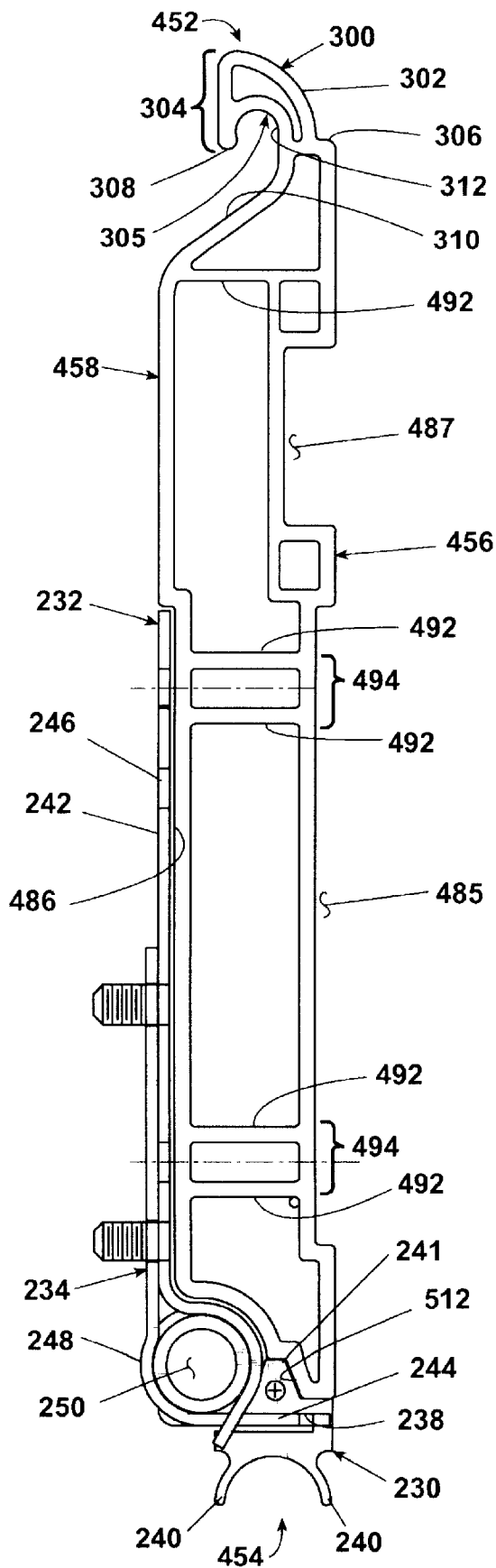
FIG. 21 is a side view of a bottom panel for a second embodiment of the invention and illustrating an upper side structure forming a portion of the hinge.

Referring to FIGS. 20 and 21, the second embodiment bottom panel 280 comprises a projection 300 having a back 302 and a generally flat face 304 overlying a curl or recess portion 305. The back 302 terminates inwardly of the outer wall 456 to form a stop 306. The transition between the face 304 and the curl 305 forms a depending flange 308. The curl 305 comprises an angled portion 310 that transitions into a vertically oriented portion 312. The projection 300 functionally forms a hinge plate. The depending flange 308 forms part of the hinge.

A hardware recess 485 and reflector recess 487 are formed in the outer wall 456 and a seal recess 486 is formed in the inner wall 458. The hardware recess receives the latch assembly 26 and the seal recess 486 receives the seal assembly 160.

Figure 22:
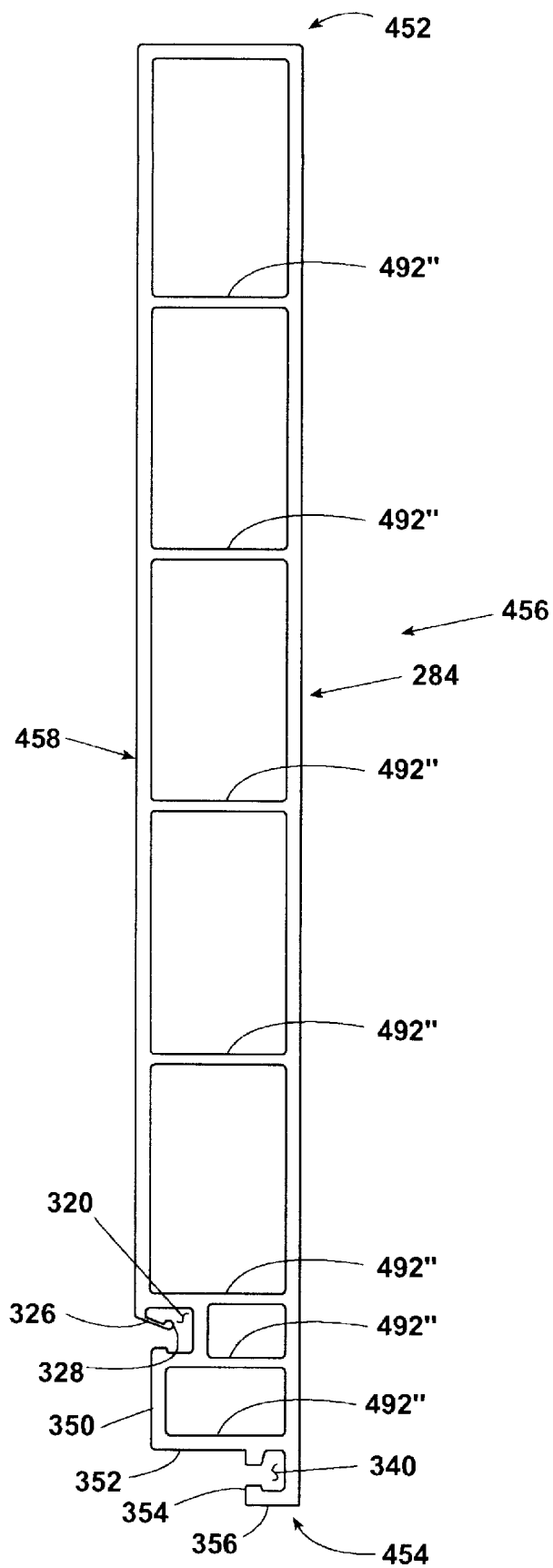
FIG. 22 is a side view of a top panel for the second embodiment of the invention and incorporating the same upper side structure as the bottom panel and having a new lower side structure.
Figure 23:
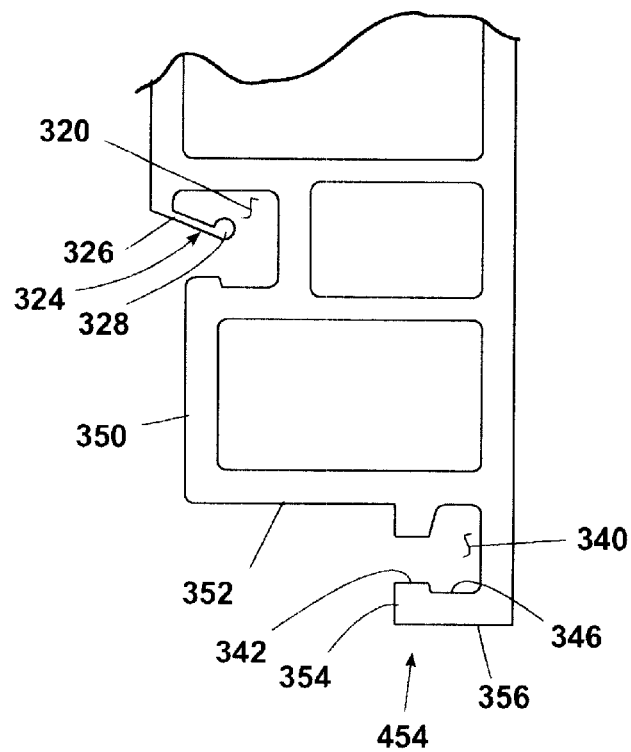
FIG. 23 is an enlarged view of a lower side structure of the bottom panel for connecting a hinge element to complete the hinge for the second embodiment.

Referring to FIGS. 22 and 23, the second embodiment top panel 284 does not include a projection 300 formed at the upper end thereof. Instead, the upper end 452 of the top panel 284 terminates in a flat surface as does the top panel of the first embodiment. The upper end of the second embodiment can be cut in the same manner as described for the first embodiment.

The lower end 454 of the top panel 284 comprises a first channel 320 opening onto the inner side 458. A lip 322 extends into the channel 320. A resilient locking finger 324 extends into the channel 320 on a side opposite the lip 322. The resilient locking finger 324 includes a stem 326 that terminates in a head 328.

A second channel 340 is formed near the outer side 456, but still opens toward the inner side 458. The channel 340 comprises a neck 342 that transitions into a head 346, which has a larger cross-sectional width than the neck 342. The portion of the inner side 458 transitioning between the first channel 320 and the second channel 340 comprises a step 350 and a riser 352. The transition from the second channel 340 to the outer side 456 also comprises the steps 352 and a riser 350.

Figure 24:
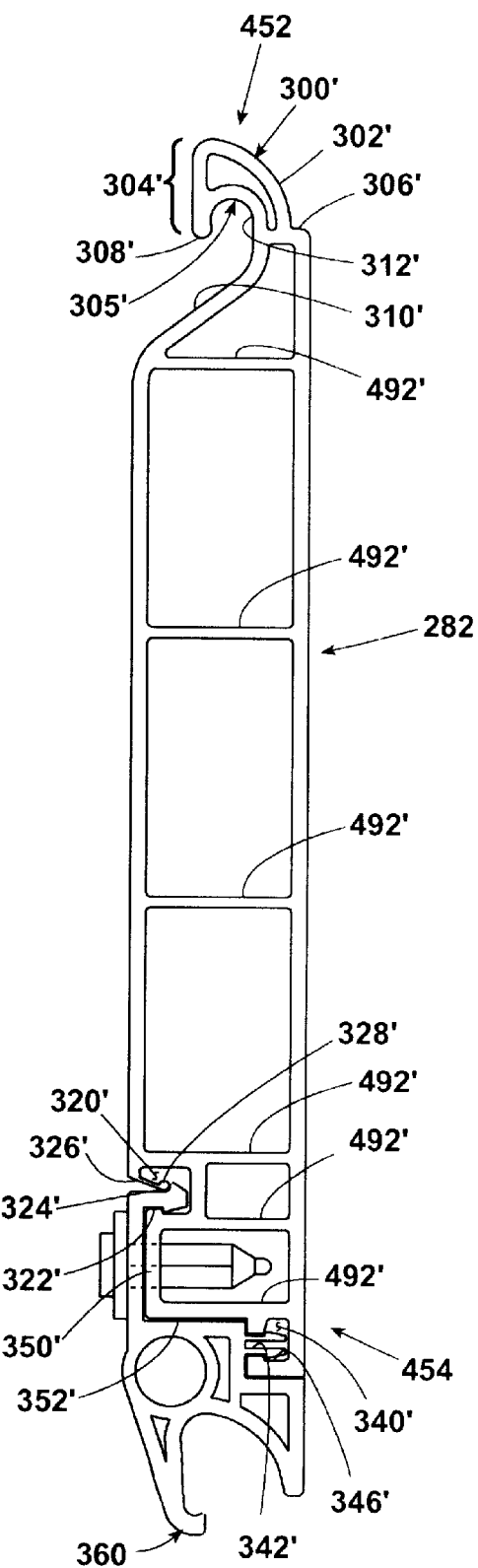
FIG. 24 is a side view of an intermediate panel for the second embodiment incorporating the same upper end structure as the bottom panel and the same lower end structure as the top panel and additionally shows a hinge coupler attached to the lower end structure.

Referring to FIGS. 24, the second embodiment intermediate panel comprises the same projection 300' on the upper side 452 as the projection 300 of the bottom panel and the same structure on the lower side 454 as the top panel 284. Therefore they will not be described in detail.

Figure 25:
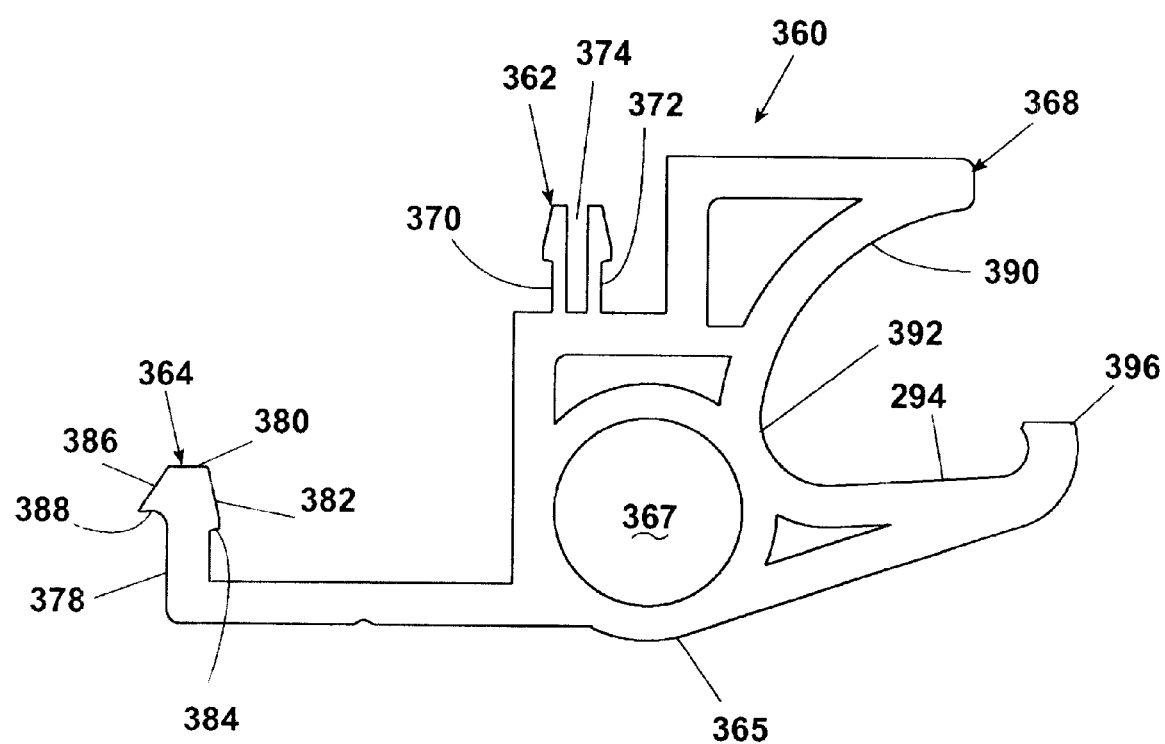
FIG. 25 is an enlarged side view of the hinge coupler of FIG. 24.

Referring to FIGS. 24 a hinge coupler 360 is shown mounted to the lower side 454 of the intermediate panel and cooperates with the projection 300 of another panel to hingedly couple together the panels. FIGS. 24 and 25 further illustrate the features of the hinge coupler 360, which includes first and second connectors 362 and 364 for connecting the hinge coupler 360 to the lower side 454 of the panel. An axle seat 365 is integrally formed with the connectors 362, 364 and defines a shaft opening 367 for receiving the axle shaft of the roller assembly. A hinge channel 368 is integrally formed with the hinge coupler 360. The hinge channel 368 cooperates with the projection 300 to hingedly connect the upper side 452 of one panel to the lower side 454 of another panel.

The first connector 362 comprises opposing spring fingers 370, 372, separated by a gap or channel 374 and forming an outer periphery that transitions from a neck to a head. The first connector 362 is received within the second channel 340 by inserting the head into the neck 342 of the channel 340, which deflects the spring fingers 370, 372 inwardly, until the head extends beyond the neck 342 of the channel 340 where the spring fingers 370, 372 can then return to their original position with the head of the first connector 362 received within the head of the channel 340.

The second connectors 364 also comprises a neck 378 that transitions into a head 380 having an asymmetrical cross-section. One side of the head 380 comprises an angled surface 382 that transitions into a laterally extending shoulder 384. The other side of the head 380 comprises an angled surface 386 that transitions into a radius 388 that is complementary to the shape of the head 328 for the locking finger 324. When the second connector 364 is received within the first channel 320, the shoulder 384 bears against the inner end of the lip 322 and the head 328 of the resilient finger 324 rests within and abuts against the radius 388.

The resilient finger 324 functions as a lock and holds the second connector 364 within the first channel 320. The resilient finger 324 must be deflected into the channel 320 to provide sufficient clearance for the second connector 364 to be removed through the open end of the first channel 320. As with the first embodiment, once a portion of the second connector 364 has been removed from the first channel 320, the remainder of the second connector 364 can be "unzipped" by pulling outwardly on the first connector 362 which will continue to deflect the resilient finger 324 as the second connector 364 is removed.

The hinge channel 368 comprises an arcuate surface 390 that transitions through a radius 392 into a relatively straight portion 394. The straight portion 394 terminates in a hook 396. The curvature of the hook 396 preferably, but does not need to, corresponds to the curvature of the depending flange 308 for the projection 300. The hinge channel 368 has a mouth extending between the arcuate surface 390 and the hook 396.

Figure 26:
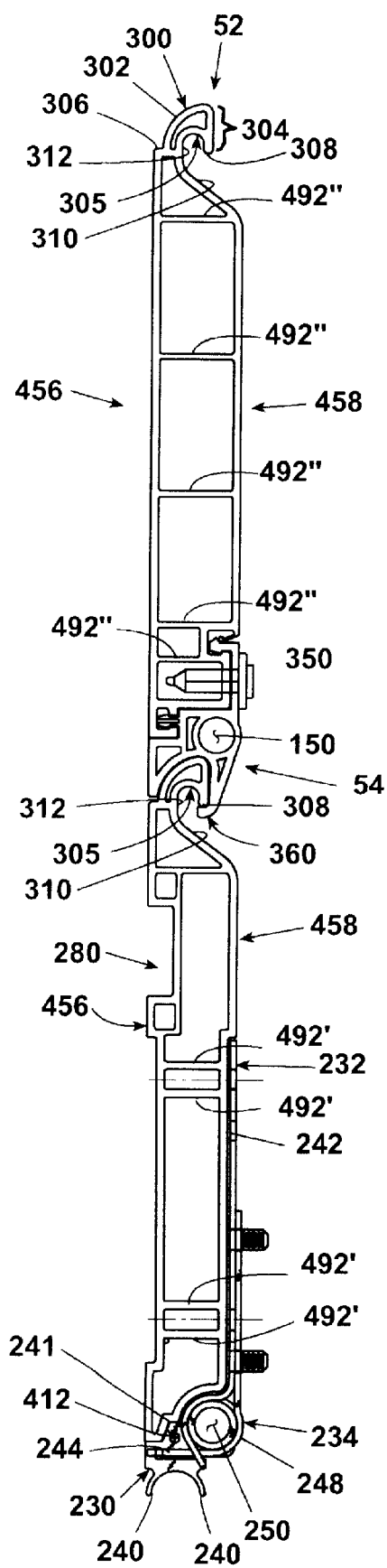
FIG. 26 is a side view of multiple intermediate panels of the second embodiment coupled together and arranged in a coplanar or closed orientation.
Figure 27:
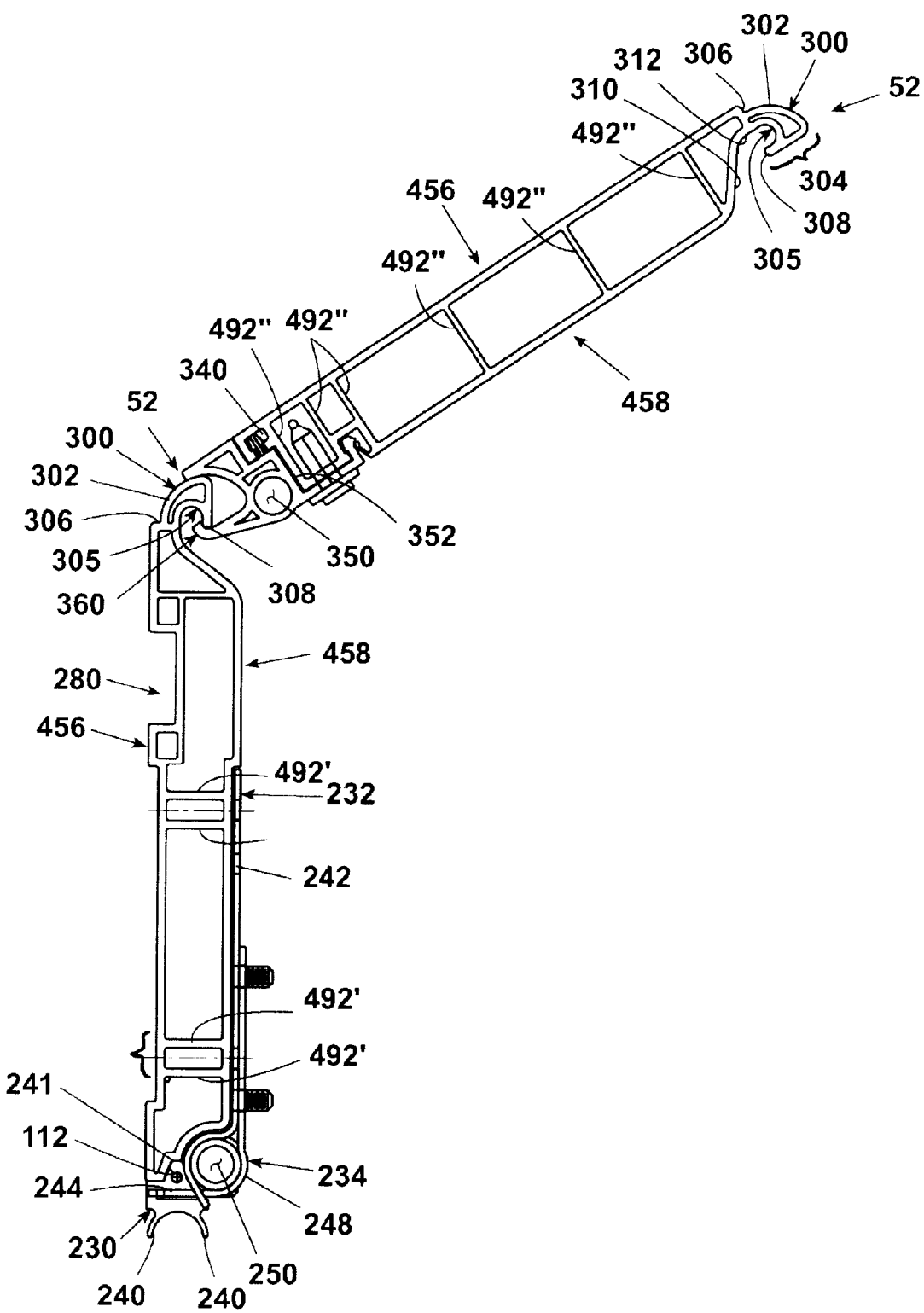
FIG. 27 is a side view similar to FIG. 26 except that at least one of the panels is rotated relative to the adjacent panel to illustrate the panels in an opened position.

Referring to FIGS. 26 and 27, the panels of the second embodiment are shown in the coplanar and rotated positions, respectively. The panels are assembled when they are in a rotated position. To couple the projection 300 to the hinge coupler 360, the projection 300 is oriented relative to the hinge channel 368 such that the projection 300 can be slidably inserted into the hinge channel 368. The maximum effective width of the projection 300 is selected such that it can only pass through the mouth of the hinge channel 368 within a predetermined range of angles. The angular range for inserting the projection 300 into the hinge channel 368 is generally selected such that it does not include an angle that the panels will form during normal operation to prevent the inadvertent uncoupling of the panels.

Once the projection 300 of one panel is received within the hinge channel 368 of another panel, the depending flange 308 is brought into abutting contact with the inner surface of the hook 396. The point of abutment between the depending flange 308 and the hook 396 forms the axis of rotation for the connected panels.

As with the first embodiment, the arcuate surface 390 of the hinge channel 368 overlies and is in substantially abutting contact with the back 302 of the projection 300 throughout the entire operational rotational range of the panels to thereby prevent the formation of any gap that could pinch the finger of the user.

Referring once again to FIGS. 20 and 21, the seal assembly 160 comprises an elongated seal 230 that is positioned relative to the bottom panel 280 by backing plate 232. Multiple wheel assembly mounting brackets 234 secure the backing plate 232 and, thus, the seal 230 to the bottom panel 280.

The seal 230 comprises a main body 236 in which is formed a slot 238. A pair of depending seals 240 extend away from the main body 236. A positioning rib 241 extends upwardly away from the main body 236 and is shaped to be received within the seal seat 512 of the bottom panel 280.

The backing plate 232 comprises a vertical leg or face 242 from which extends a mounting flange 244, which is sized to be received within the slot 238 of the seal 230. The face 242 has a height such that face 242 is received within the backing plate recess 486 and the positioning rib 241 is held in contact within the seal seat 512. The face 242 comprises multiple openings 246 through which fasteners 75 can be inserted to secure the backing plate 232 to the bottom panel 280. Preferably, the openings 246 are located on the face 242 such they align with and correspond to the fastener supports 494.

Wheel assembly brackets 234 are mounted on opposing ends of the lower panel 280. The wheel assembly brackets 234 included an axle mount 248 that defines an axle socket 250 sized to receive the axle of the wheel assembly. The wheel assembly brackets 234 include openings 252 that correspond with similar openings 246 on the backing plate 232 such that the same fastener 75 can mount the wheel assembly brackets 234 and the backing plate 232 to the bottom panel 280. The wheel assembly brackets 234 are well-known and have been used a long time in the art. Therefore, they will not be described in greater detail.

Another advantage of the design of the bottom panel 280 is that the backing plate recess 486 aids in aligning the backing plate 232 and, thus, the seal 230 with respect to the bottom panel 280 in addition to the alignment of the latch assembly 26 through the latch recess 485.

Further, both the seal assembly 160 and the latch assembly 26 are secured to the bottom panel 280 thorough fasteners 75 that pass-through corresponding openings in the latch assembly 26 in the backing plate 242 and into the channel 486. The fastener supports 494 provide a force distribution surface to accommodate the compression force associated with the fasteners 75. If the fasteners 75 are threaded, the ribs 92 of the fastener supports 94 can provide a retaining support into which the threads can be received. Since the fastener supports 94 extend across the entire width of the panel 80, they provide great flexibility in the location where the fasteners 75 can be used.

Reasonable modification and variation are possible within the scope of the forgoing disclosure without departing from scope and spirit of the invention which is defined in the appended claims.

The invention claimed is:

1. In a roll-up door for selectively closing an opening in a trailer, the opening being defined in part by a bottom wall of the trailer, the roll-up door comprising multiple integrally formed elongated panels having opposing interior and exterior walls and an upper and lower sides connecting an upper portion of the walls and a lower portion of the walls, respectively, the panels are stacked in an upper side to lower side orientation, a hinge rotatably couples adjacent panels, and one of the panels is a bottom panel whose lower side is adapted to be positioned adjacent the trailer bottom wall when the roll-up door is mounted to the trailer and in a closed position, and a latch assembly with a part having a vertical dimension mounted to the bottom panel and adapted to be selectively coupled to the trailer to lock the roll-up door in the closed position, the improvement comprising:

the bottom panel is extruded and has a predominately hollow interior between the exterior and interior walls, the bottom panel further includes a latch recess having a vertical dimension substantially equal to the vertical dimension of the latch assembly part in the exterior wall and multiple mounting supports disposed within the hollow interior and extending between the latch recess and the interior wall, and the latch assembly is received in the latch recess with the part seated in the latch recess; whereby the latch assembly is positioned in a predetermined vertical location on the bottom panel.

2. The improvement of claim 1, wherein the latch assembly part is a mounting plate.

3. The improvement of claim 2, and further comprising an alignment indicia on the front wall of the panel for use in laterally aligning the latch assembly relative to the bottom panel.

4. The improvement of claim 1, wherein the mounting supports comprise extruded walls extending between the latch recess and the interior wall and arranged in spaced pairs and defining a channel therebetween in which a mechanical fastener is received.

5. The improvement of claim 4, wherein the spacing of the walls is such that a head of the mechanical fastener used to fasten the latch assembly to the bottom panel will overlie at least a portion of at least one of the walls of a pair.

6. The improvement of claim 5, wherein the mechanical fastener is threaded and the spacing of the walls is greater than the outer diameter of the mechanical fastener.

7. The improvement of claim 1, and further comprising a backing plate recess on the interior wall and at least part of the backing plate recess is opposite a portion of the latch recess.

8. The improvement according to claim 7, wherein the mounting supports extend between the latch recess and the backing plate recess.

9. The improvement according to claim 1, and further comprising a reflector recess formed in the exterior wall, located above the latch recess and of a size to receive therein a conspicuity reflector.

10. A roll-up door for selectively closing an opening in a truck or trailer, the opening being defined in part by a bottom wall of the trailer, the roll-up door comprising:

multiple integrally formed elongated panels having opposing interior and exterior walls with a relatively hollow interior and an upper and a lower side connecting an upper portion of the walls and a lower portion of the walls, respectively, and open ends, the panels are stacked in an upper side to lower side orientation, one of the panels is a bottom panel whose lower side is adapted to be positioned adjacent the trailer bottom wall when the roll-up door is mounted to the trailer and in a closed position, a hinge rotatably couples adjacent panels together, each of the panels has at lateral sides thereof at least a pair of wheel assemblies comprising a roller that is adapted to mount into a rail at the side of the truck or trailer opening and a wear resistant axle that is received in a socket coupled to the panels, end caps that close the open ends of the panels, the end caps including mounting tabs that fit within open ends of the panels, and a latch assembly mounted to the bottom panel and adapted to be selectively coupled to the trailer to lock the roll-up door in the closed position, each of the sockets is formed of a wear resistant material and is connected to a mounting plate that is attached to each of the lateral sides of the panels through mechanical fasteners that extend through the interior and exterior walls of the panels and through the mounting tabs of the end caps to secure the end caps to the panels.

11. A roll-up door according to claim 10 wherein the sockets are formed of a wear-resistant metal.

12. A roll up door according to claim 10 wherein the sockets are integrally formed with the mounting plates.

13. A roll up door according to claim 12 wherein the axles are made of metal.

14. A roll up door according to claim 13 wherein the panels are extruded and have a uniform cross-section between the lateral sides thereof with open ends.

15. A roll up door according to claim 14 wherein the panels are integrally formed of a rigid plastic material.

16. A roll up door according to claim 14 wherein the panels are formed of a lightweight metal.

17. A roll up door according to claim 10 wherein the panels are extruded and have a uniform cross-section between the lateral sides thereof with open ends.

18. A roll up door according to claim 17 wherein the panels are formed of a rigid plastic material.

19. A roll up door according to claim 17 wherein the panels are formed of a lightweight metal.

20. A roll up door according to claim 10 wherein the end caps are made of an injected molded plastic.

21. A roll up door according to claim 10 wherein the sockets are made from a tough wear resistant plastic.

22. A light weight roll-up door for use in closing a rear opening of a truck or trailer, the roll-up door comprising:

multiple elongated panels, each panel having a generally rectangular periphery having inner and outer opposing surfaces spaced from each other, an upper edge, a lower edge and opposite side edges, each of the panels having a uniform cross sectional configuration between the opposite side edges, and wherein the panels are stacked in upper edge to lower edge orientation;

a hinge assembly between the upper and lower edges of the panels for relative rotation of the panels with respect to each other about a transverse axis;

the hinge assembly comprises:

an elongated arcuate projection formed in one of the upper and lower edges of the elongated panels at an outer portion thereof and including an elongated flange with a terminal end portion depending therefrom; and an elongated socket positioned at the other of the upper and lower edges of the panels and including an inner surface with a curvature complementary with the curvature of the arcuate projection and an elongated hook portion;

wherein the elongated arcuate projection fits within the socket and the elongated flange terminal end portion rests on the elongated hook portion for relative rotation of the elongated panels with respect to each other about the terminal end portion and the elongated arcuate portion fills a gap at the facing edges of the panels as the panels rotate about the hinge; and at least one elongated groove integrally formed in the inner surfaces of the panels at the other of the upper and lower edges and having a retainer lip at the edge of the groove; and a hinge coupler that includes the elongated socket and has a connector with a snap fit fastener that is snap fit into the elongated groove and retained therein by the retainer lip.

23. The lightweight roll-up door according to claim 22 wherein the snap fit fastener comprises a compressible fastener.

24. The roll-up door according to claim 23, wherein the compressible fastener comprises two spaced resilient fingers defining a gap therebetween and the compressible fastener is compressed by deflecting at least one of the fingers into the gap.

25. The roll-up door according to claim 24, wherein the outer cross-sectional periphery of the fastener generally conforms to the cross-sectional shape of the groove.

26. The light weight roll-up door according to claim 22 wherein the hinge coupler includes an axle mounting bracket and further comprising a wheel assembly mounted to the axle mounting bracket.

27. The light weight roll-up door according to claim 26 wherein the axle mounting bracket includes an axle seat and the wheel has an axle mounted in the axle seat.

28. The light weight roll-up door according to claim 27 wherein the axle seat is made from a wear-resistant material.

29. The light weight roll-up door according to claim 22 wherein there are two elongated grooves formed in the panels at the other of the upper and lower edges, each of which has a retainer lip at the edge of the groove, and further comprising a second connector on the hinge coupler that is releasably retained in one of the two elongated grooves.

\* \* \* \* \*